US011479327B2

(12) United States Patent
Eva

(10) Patent No.: US 11,479,327 B2
(45) Date of Patent: Oct. 25, 2022

(54) PET CORRAL FOR KAYAK

(71) Applicant: Monique Renee Eva, Narragansett, RI (US)

(72) Inventor: Monique Renee Eva, Narragansett, RI (US)

( * ) Notice: Subject to any disclaimer, the term of this patent is extended or adjusted under 35 U.S.C. 154(b) by 433 days.

(21) Appl. No.: 16/696,388

(22) Filed: Nov. 26, 2019

(65) Prior Publication Data

US 2020/0172209 A1 Jun. 4, 2020

Related U.S. Application Data

(60) Provisional application No. 62/773,832, filed on Nov. 30, 2018.

(51) Int. Cl.
| | | |
|---|---|---|
| *A01K 1/02* | (2006.01) | |
| *B63B 34/20* | (2020.01) | |
| *B63B 34/26* | (2020.01) | |
| *B63B 32/70* | (2020.01) | |

(52) U.S. Cl.
CPC ............ *B63B 32/70* (2020.02); *A01K 1/0236* (2013.01); *B63B 34/20* (2020.02); *B63B 34/26* (2020.02)

(58) Field of Classification Search
CPC ......... B63B 32/70; B63B 34/20; B63B 34/26; B63B 32/77; A01K 1/0236
See application file for complete search history.

(56) References Cited

U.S. PATENT DOCUMENTS

| | | | |
|---|---|---|---|
| 4,739,720 A | 4/1988 | Jarschke | |
| 5,243,928 A | 9/1993 | Brenaman | |
| 8,418,643 B2 | 4/2013 | Povich | |
| 2009/0025624 A1 | 1/2009 | Boelryk | |

FOREIGN PATENT DOCUMENTS

JP 2005342268 A 12/2005

OTHER PUBLICATIONS

International Search Report and Written Opinion dated Mar. 11, 2020 received in related International PCT Application No. PCT/US19/63348 filed Nov. 26, 2019 (14 pages).
Ready to Shoot Starter Boat for Sale by ohiogamefishing.com; available on Jun. 12, 2012; p. 1 and 2; retrieved Jan. 7, 2020; https://www.ohiogamefishing.com/threads/ready-to-shoot-starter-boat-for-sale.204767/ (5 pages).
Marine Mat Hobie Outbock by delawarepaddlesports.com; available on Jan. 31, 2018; p. 2; retrieved Jan. 23, 2020 https://Web.archive.org/Web/20180131153851/https://www.delawarepaddlesports.com/marine-mat-hobie-outback/ (4 pages).

*Primary Examiner* — Anthony D Wiest
(74) *Attorney, Agent, or Firm* — Wilmer Cutler Pickering Hale and Dorr LLP

(57) ABSTRACT

Provided herein is a pet carrier system for providing a defined area on a kayak for safe travel of a pet. In some embodiments, the pet carrier system includes a corral made of at least three vertical posts securable to the kayak, at least two railing bars connecting the three vertical posts, and at least three connectors for securing the vertical posts to the kayak. The corral provides a fenced structure from the front end of the kayak up to the area in front of the cockpit of the kayak. The system would dissuade a pet from moving transversely relative to the longitudinal axis of the kayak and would persuade the pet to either remain in the defined space or to move relatively aligned with the longitudinal axis of the kayak. This way, the pet is less likely to overstep onto either side of the kayak and cause the kayak to capsize.

17 Claims, 19 Drawing Sheets

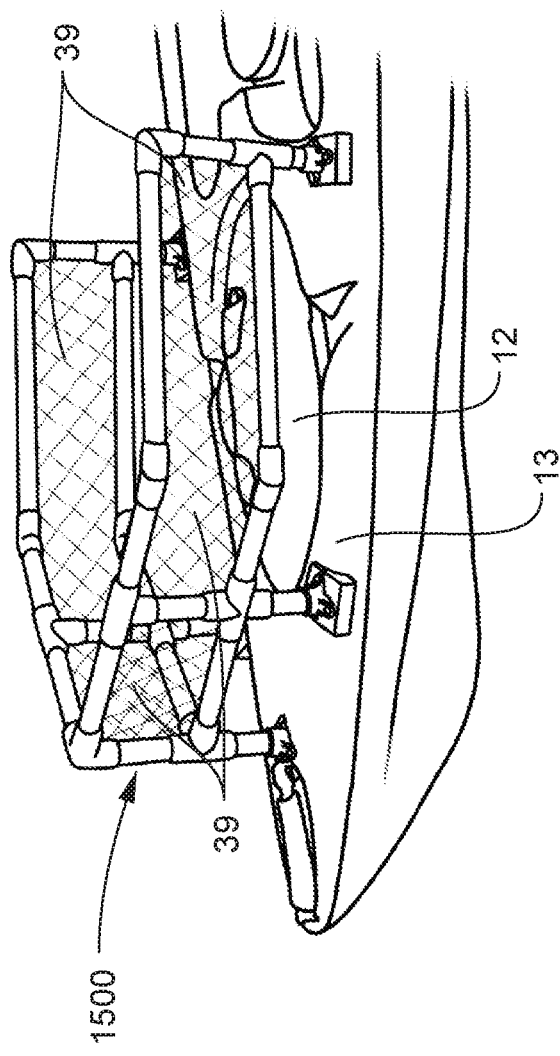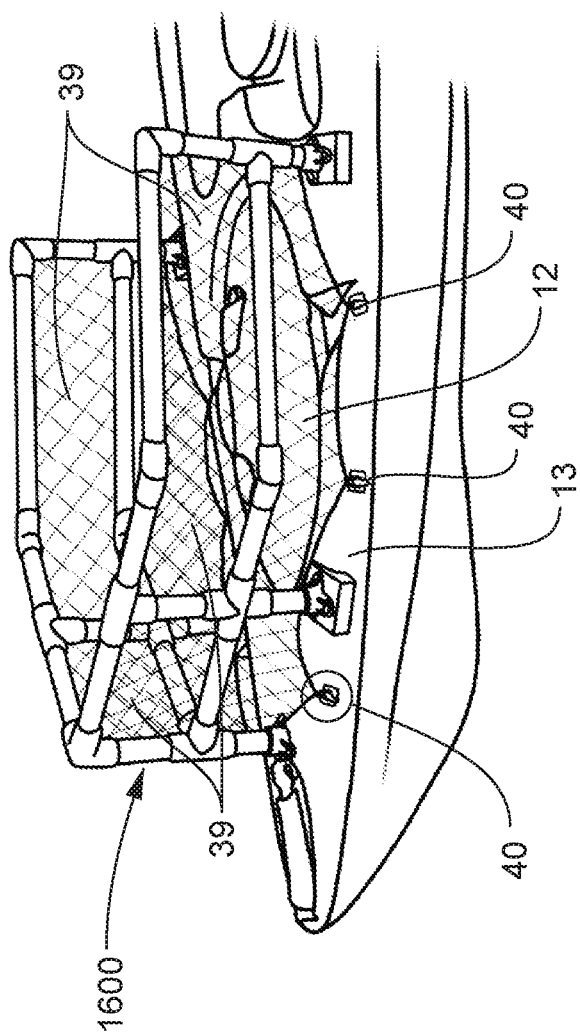

PET CORRAL FOR KAYAK

RELATED APPLICATION

This application claims the benefit of U.S. Provisional Application No. 62/773,832, filed Nov. 30, 2018, which is incorporated by reference herein in its entirety.

TECHNICAL FIELD

This application relates to a pet carrier system for kayaks.

BACKGROUND

Surface cargo railing systems for securing cargo to the kayak deck has been known. For example, see U.S. Pat. No. 5,243,928. These surface cargo railings systems are conventionally fixed to the deck areas immediately in front of or behind the cockpit. The purpose of these railings is to allow kayakers to have easy access to the cargo during the voyage. For example, a kayaker on a fishing trip may place his or her fish baits, ice buckets, and lunch box in the areas surrounded by the cargo railings for easy access. These railings are designed for tying or securing the cargo against the deck to prevent the cargo from slipping off the kayak. These cargo railing systems are also closer to the cockpit to reduce the cargo's exposure to water, as compared for example to having the cargo at the bow of the kayak. Overall, the cargo railing systems are not suitable for keeping a pet safe during a voyage; therefore, a new system is needed.

SUMMARY

Preferred embodiments of the invention provide pet carrier systems that include an onboard supporting structure to help a pet companion feel safe during a kayaking voyage. The systems also help the pet companion stay balanced when the kayak is traveling through rough conditions.

Disclosed embodiments include, in one aspect, a pet carrier system for providing a defined area on a kayak for safe travel of a pet. The pet carrier system includes a corral that includes at least three vertical posts and two horizontal bar railings. The vertical posts are securable to the kayak. At least one of the three vertical posts is securable near the front end (bow) of the kayak and projects generally perpendicular to the top surface of the kayak. The other two vertical posts are securable generally on the opposing sides of the kayak (along the starboard side and the port side), and projects perpendicularly to the top surface of the kayak. According to some aspects, one or more connectors are used to connect the horizontal bar railings to the vertical posts. In some embodiments, the corral includes at least five vertical posts connected to at least four horizontal railing bars via at least five connectors.

In certain aspects, the corral provides a fenced structure from the bow of the kayak up to the area in front of the cockpit of the kayak. The corral defines a space having a shape generally longer along the longitudinal axis of the kayak and generally shorter transverse to the longitudinal axis. In these aspects, the front end of the corral is closed and the tail end of the corral, near the cockpit, is open. The shape of the defined space is designed to dissuade a pet companion from moving transversely relative to the longitudinal axis of the kayak. In addition, it is also designed to persuade the pet companion to either remain in the defined space or to move along the longitudinal axis of the kayak in the defined space. In some embodiments, a gripping pad system is added to help the pet remain stable.

Before explaining exemplary embodiments in detail, it is to be understood that the disclosure is not limited in its application to the details of construction and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of disclosed embodiments will be more fully understood after a review of the following figures, detailed description, and claims.

It is to be understood that both the foregoing general description and the following detailed description are explanatory only and are not restrictive of the claimed subject matter.

BRIEF DESCRIPTION OF DRAWINGS

Various objects, features, and advantages of the disclosed subject matter can be more fully appreciated with reference to the following detailed description of the disclosed subject matter when considered in connection with the following drawings, in which like reference numerals identify like elements. While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive. Many of the figures presented herein are black and white representations of images originally created in color.

FIG. 15 is an enlarged side view of a kayak corral with safety nettings attached according to certain embodiments.

FIG. 16 is an enlarged side view illustration of a kayak corral with safety nettings extending down to the secured clips on the kayak according to certain embodiments.

DETAILED DESCRIPTION

Figure 1:
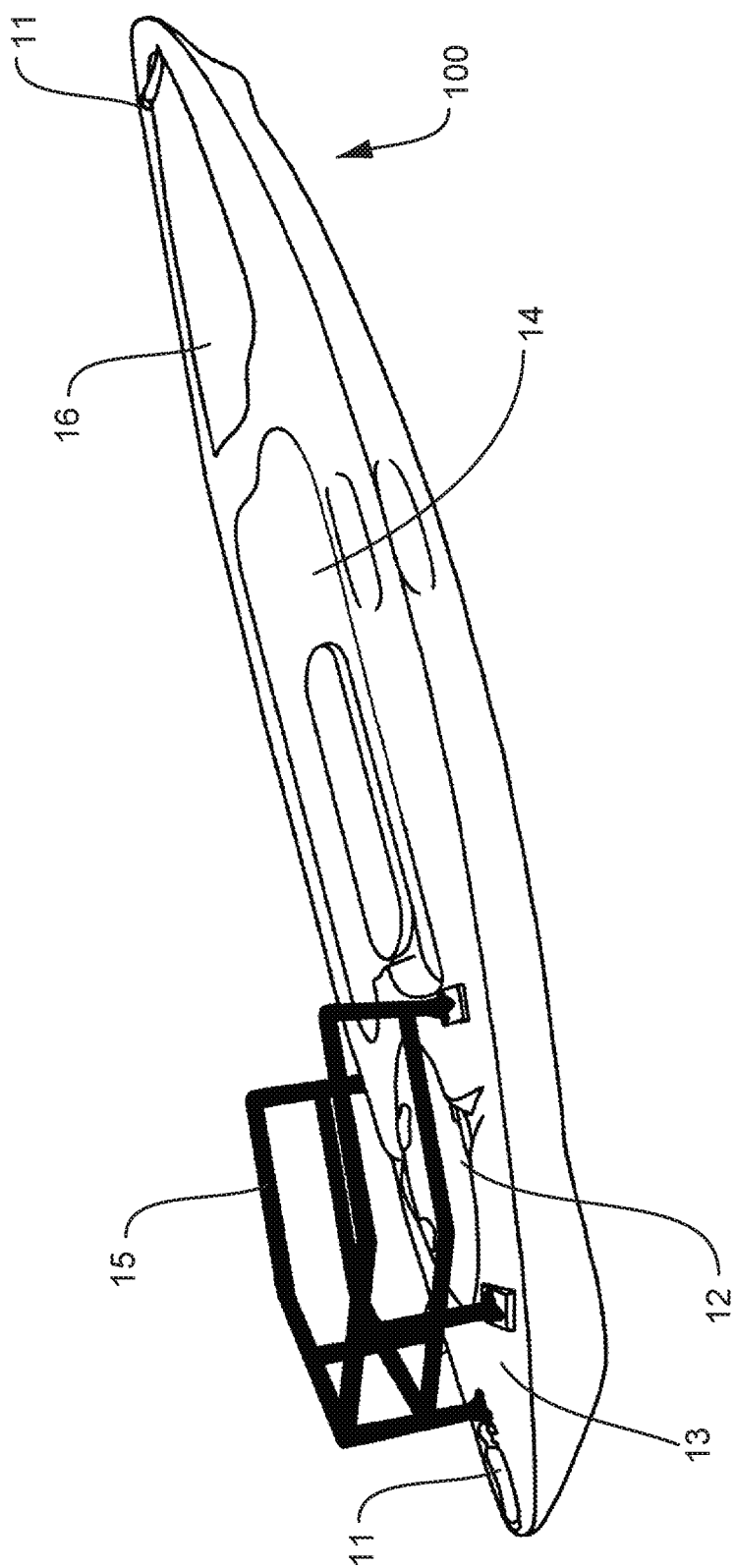
FIG. 1 is an illustration of a kayak corral according to some embodiments.

The pet carrier system disclosed herein is designed in a way to corral a pet, such as a dog, on a kayak, so that the pet may move about the kayak in a preferred and safe path, e.g., along the centerline of the vessel, and to dissuade the pet from moving transverse to the centerline.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Kayaks have long been a popular marine transportation option for one or two people. A kayak is faster and more maneuverable than either a canoe or a rowboat and is not as restricted in use as a sailboat or a motorboat. Kayaking is a popular outdoor activity. It offers a chance to get close to nature, relieve daily stress, and is a great aerobic exercise. However, given the kayak's limited passenger space, only a few companions can enjoy the experience together. And most kayaks do not have a space designed for traveling with a pet.

If the water is calm, most trained dogs should have no problem sitting on the deck. However, if the water gets choppy, the dog may adjust its position constantly in response. If the kayaker is unable to maintain his or her balance during such an event, the kayak may flip over. Hence, it is desirable to have an onboard supporting structure to help dogs feel safe during the travel, and to also help them stay balanced under less than ideal wave conditions, and to dissuade movement which might make the vessel less stable.

In one aspect of the invention, there is a pet carrier system designed for kayaks. In a preferred embodiment, the system modifies the extreme end of the bow area to introduce a safe area where pets such as a dog can ride with the kayaker. The pet carrier system is designed to enable the pet passenger to move along the center line of the kayak while dissuading the pet passenger from moving from side to side. While one or more aspects of the invention are discussed with respect to traveling with a dog, the pet carrier system is not limited to traveling with a dog. The system is suitable for traveling with other animals as well.

In one embodiment, the kayak corral is designed to instill a feeling of security and protection in a dog traveling via a kayak. In some embodiments, the system is designed to harmlessly confine the dog on the kayak's deck for example in the bow. In some embodiments, the kayak corral is composed of two or more railings connected together and extending high enough off the deck to prevent the dog from accidentally falling off the kayak deck. In some embodiments, the system includes one or more gripping pads to help the dog stay balanced during choppier waves. Such modifications make the act of kayaking an all-around safer and more relaxing experience for both human and dog.

In addition, the system would promote better stability for the dog and its human passenger as well as the entirety of the vessel. One other purpose of the system is to prevent a clumsy animal from accidentally overstepping onto either side of the watercraft, which can throw the kayak off balance and present the real possibility of capsizing.

According to certain aspects, it is desirable for the kayak corral to be adjustable. According to some embodiments, it is also desirable that the pet carrier system is not permanently bound to the kayak such that the corral can be quickly mounted and removed from the kayak.

According to certain aspects, the purpose of the pet carrier system is to make the dog feel safe during voyages but at the same time not substantially interfering with the kayak's main function. According to certain embodiments, the pet carrier system includes a kayak corral enclosing the bow area of a kayak. In some embodiments, the kayak corral and a gripping system are installed on the bow surface. In some embodiments, the kayak corral is constructed with lightweight materials and designed for easy assembly. In some embodiments, the gripping system includes at least one gripping pad to help the dog stay balanced.

According to certain embodiments, the pet carrier system is designed to restrict the dog's movement from port side to starboard side but not from bow to stern. Because the kayak is most balanced along the center line, by dissuading the side-to-side movement, the overall balance is improved. Unlike conventional cargo racks where the railings are designed for tying the cargo with bungee cords or ropes, the railing of the current system is designed to keep the dog inbound but not physically restrain the dog to the confined area. It is unsafe to tie the dog to the kayak because in case of capsize doing so would impose a real danger for the dog.

FIG. 1 illustrates three-dimensional kayak corral mounted on a kayak according to certain embodiments. The illustration depicts a kayak 100, kayak corral 15, bow tip 11, bow 13, frontal body of the kayak 12, cockpit 14, deck 16, and stern 11. While the disclosure primarily describes attaching the corral to a kayak, the water vessel here can be canoes, paddle boards, or other elongated water vessels. Kayak 100 can be any type of kayak such as a sit-on-top kayak, sit-inside kayak, touring kayak, sea kayak, and white-water kayak. Bow 13 is the frontal portion of a kayak with grab handle 11. The bow section can be longer, shorter, wider, or narrower than the one depicted in FIG. 1. The grab handle 11 is helpful for carrying the kayak and tying the kayak to certain objects. In some embodiments, the frontal body 12 contains a cavity underneath for storage. In some embodiments, the space below is for leg room. In some embodiments, a gripping pad system is installed over the frontal body 12 of the kayak for transporting animals such as a dog. Cockpit 14 is the sitting area for the kayakers. Deck 16 and stern 11 are the back portion of the kayak 100. In some embodiments, there is also a storage space underneath the deck 16. In some embodiments, various configurations of deck bungee cords are secured to the frontal body 12 and/or the deck 16 (not shown).

Figure 2:
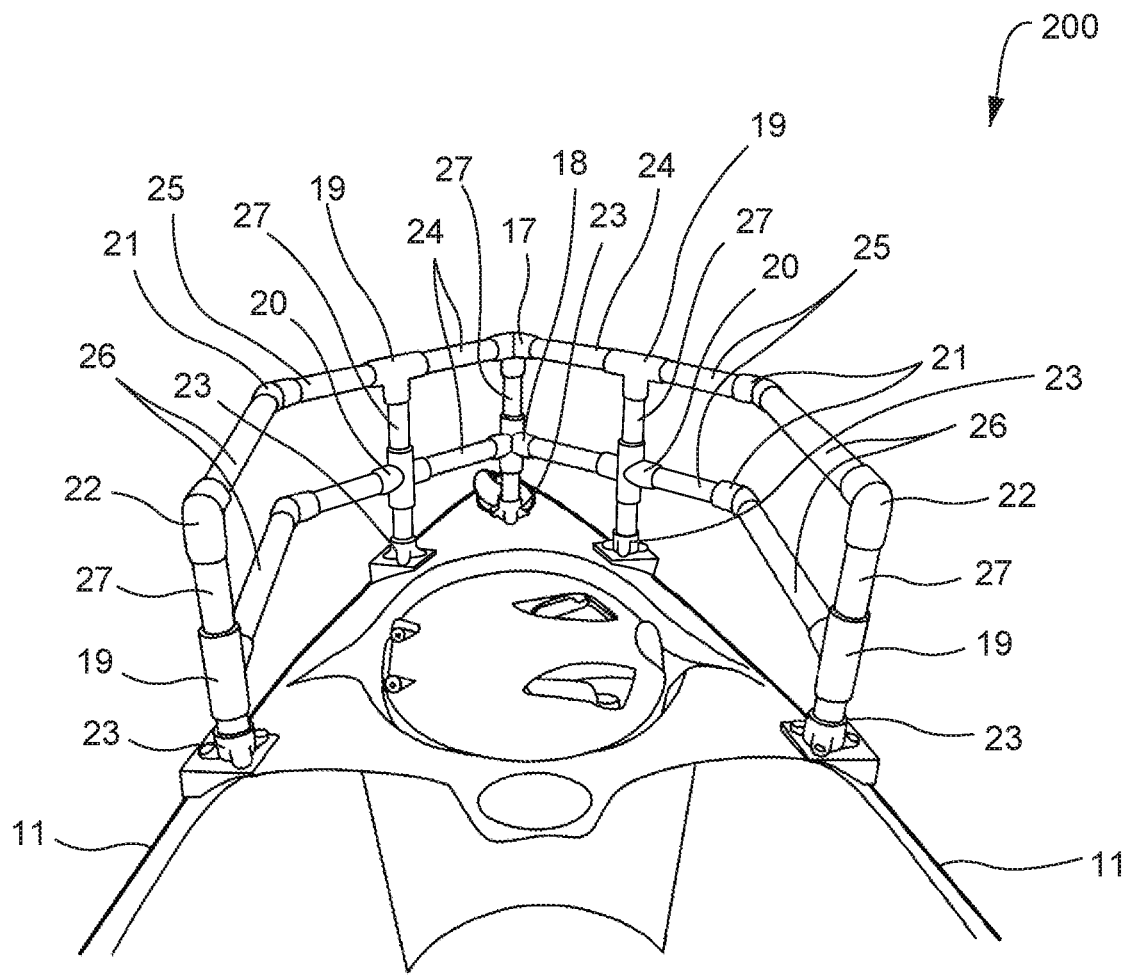
FIG. 2 is an enlarged illustration of a kayak corral from the kayaker's viewpoint according to some embodiments.

FIG. 2 illustrates a first-person point of view of the kayak corral 200 from a kayaker's viewpoint according to certain embodiments. The corral is connected by four T joints 19 (or orthogonal joints), four elbow joints 21, two angled joints 22, two cross joints 20, an angled T joint 17, and an angled cross joint 18. The corral has two levels of railing bars running in parallel where both levels are made of side bars 26, connecting bars 25, and merging bars 24. Furthermore, the kayak corral 200 is mounted via five posts 27 that connect the top railing level and the bottom railing level to the kayak. The kayak corral is secured to the kayak via the base connectors 23. In some embodiments, the wider portions of the corral are secured on the port side and the starboard side 11 of the frontal body. The joints, railing bars, and base connectors can be made of various materials such as plastic, fortified plastic, carbon fiber, fiberglass, polymers such as polyethylene, wood, aluminum, alloy, metal, or a combination thereof. In some embodiments, the joints and railing bars are made of the same material. In some embodiments, the joints and railing bars are made of different materials.

In some embodiments, the joints have a hollow center to allow a single railing bar to go through the hole. For example, a T joint 19 can have a hollow center to allow a railing bar to go through such that the connecting bar 25 and the merging bar 24 are of the same railing bar. In some embodiments, the joints are made of pockets or receptacles for inserting the bars. The pockets can be of different shapes to accommodate bars of different shapes such as cylindrical, tubular, or rectangular prism bars. In some embodiments, the connection can be friction based (e.g., insert and connect like water pipes), adhesive based (e.g., use industrial glues after the bars are inserted), or mechanical based such as using screws, pins, locks, or nails to hold the bars in place. In some embodiments, the joints are locked in a fixed angle. In some embodiments the joints are flexible. Various flexible joint mechanisms can be employed such as pivot joints (e.g., joints that open at discrete angles), rotational joints (e.g., joints that open to a range of positions on the same axis), or ball joints (e.g., joints that open to a range of positions not limited to the same axis).

Although FIG. 2 depicts a kayak corral 200 with a two-level railing, the kayak corral can be of a single level or of more than two levels. The length of the bars and posts can also vary depending on the size and shape of the kayak. In some embodiments, bars 26 are longer than bars 24 and 25; in some embodiments, bars 26 are of equal length or shorter than bars 24 or 25. In some embodiments, the bars and posts have a hollow center to reduce the overall weight. In some embodiments, the bars and posts have a solid center but are made of sufficiently light materials such as plastic (e.g., PVC), fiberglass, carbon fiber, wood, metal, or a combination thereof. In some embodiments, the bars and posts have a uniform width from end to end. In some embodiments, the width of the bar is not uniform. For example, in some embodiments, the bars and posts may have a dented area, a socket, a receptacle, or a patched surface for attaching accessories or other objects. In some embodiments, the bars can be replaced with ropes, metal wires, pipes, or a combination thereof.

In some embodiments, the kayak corral 200 may include additional components, fewer components, or any other suitable combination of components that perform any suitable operation or combination of operations.

Figure 3:
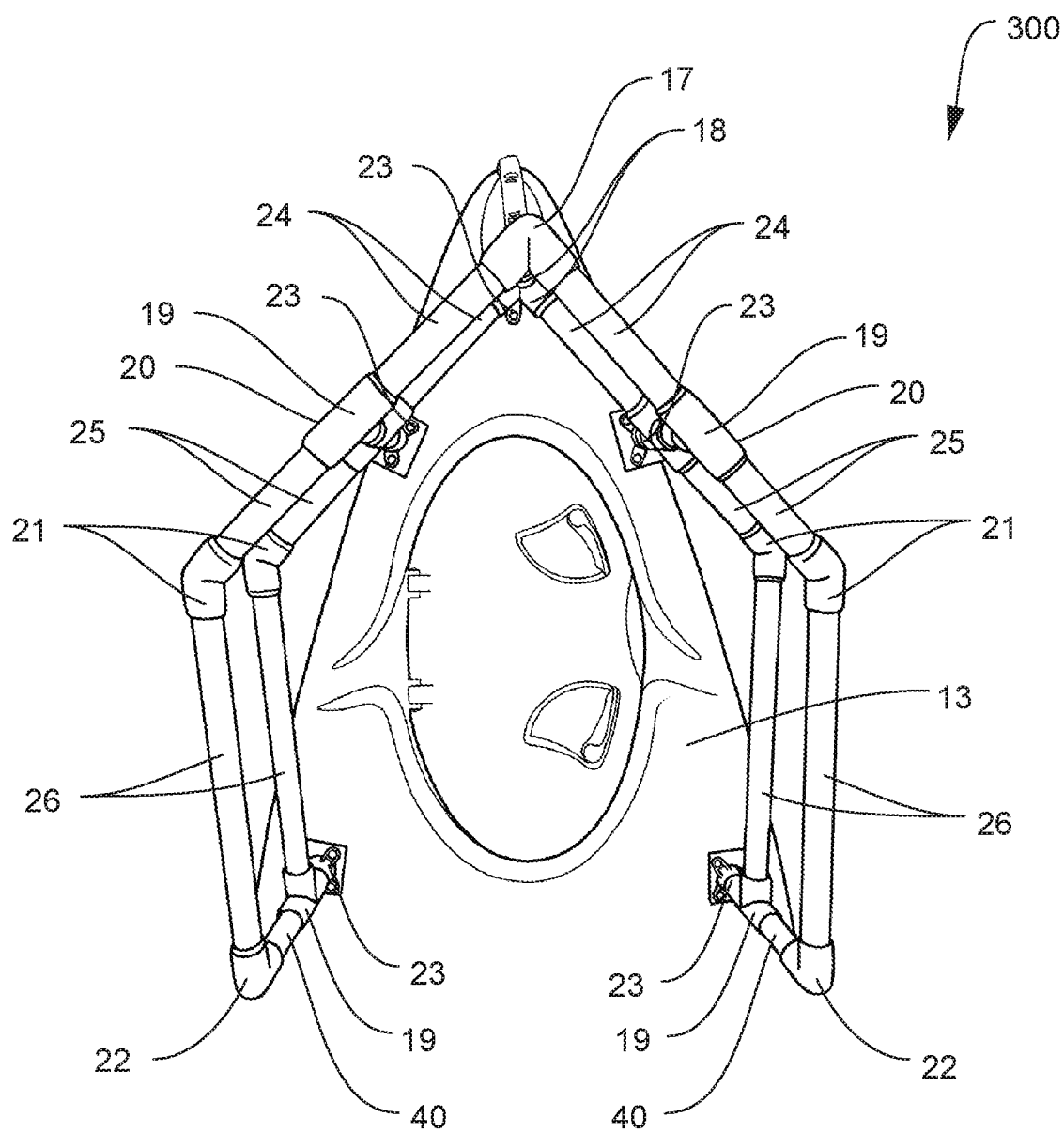
FIG. 3 is an enlarged illustration of a kayak corral from a plain view according to some embodiments.

FIG. 3 is a plain view of the kayak corral 300 according to certain embodiments. In some embodiments, the sides of a corral are wider than the bow of the kayak. As depicted in FIG. 3, in some configurations, joints 21 can flow over the top of the water, and therefore maximize the space available for the canine passengers. In some embodiments, the bow has a latch 13 for the storage space underneath. In some embodiments, the surface of the frontal area is covered with gripping pads. In some embodiments, the gripping pads are placed in such a way that they do not interfere with access to the storage area.

Figure 4:
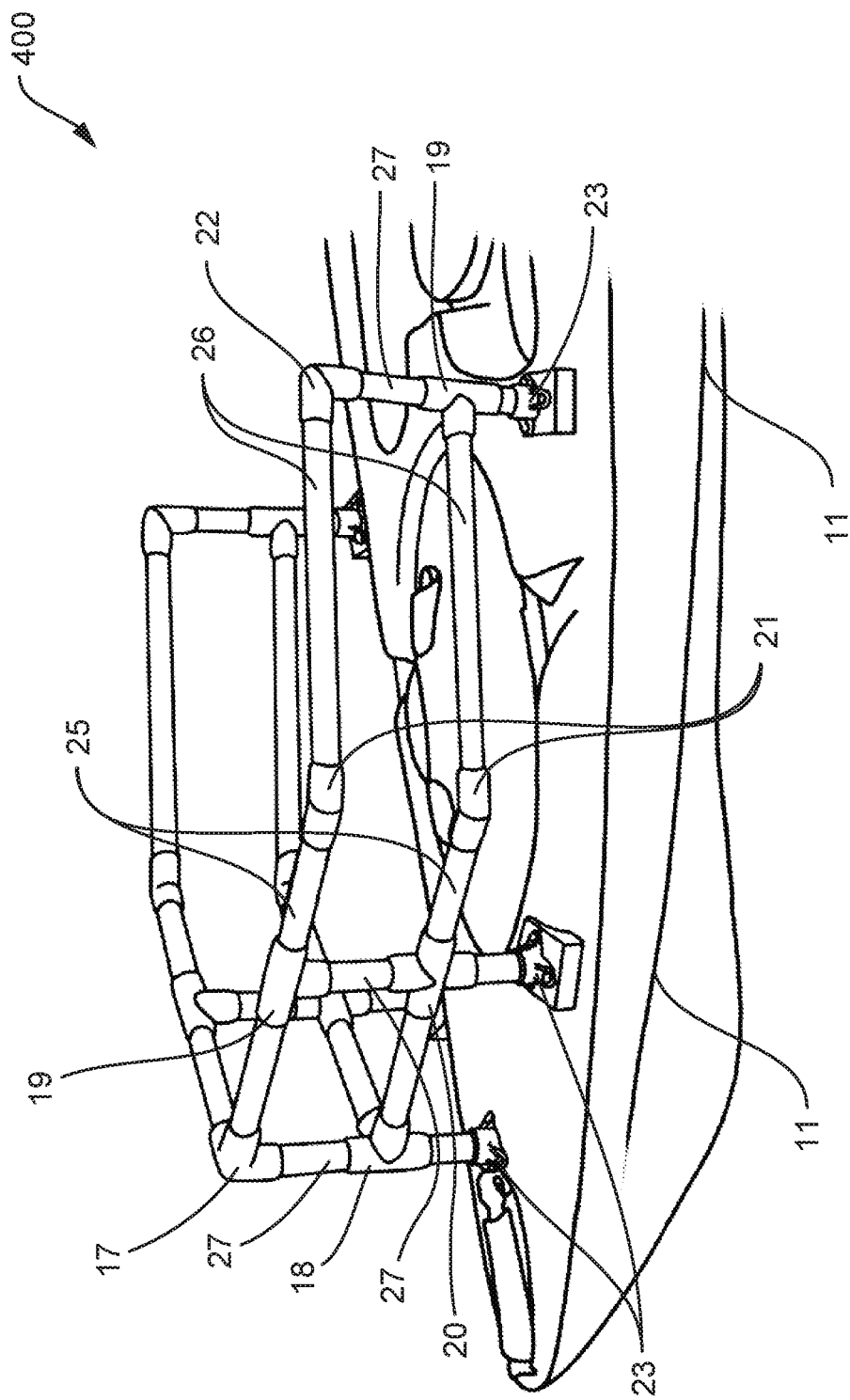
FIG. 4 is an illustration of a kayak corral from a side view according to some embodiments.

FIG. 4 is a port side view of the kayak corral 400 according to some embodiments. FIG. 4 shows that base mounts 23 are secured to the kayak via screws and securing plates at the attachment points 11. Base mounts 23 have a circular insertion socket with three extending legs for nails or screws to secure the base mounts to the kayak. Depending on the shape of the posts 27, the base mount socket can be of different shapes (e.g., square, circle, hexagon etc.) If the attachment areas 11 have solid structures inside the kayak, the screws can be secured to the solid structures. If the space underneath is hollow, a backplate can be used to hold the screws or nails in place.

Figure 5:
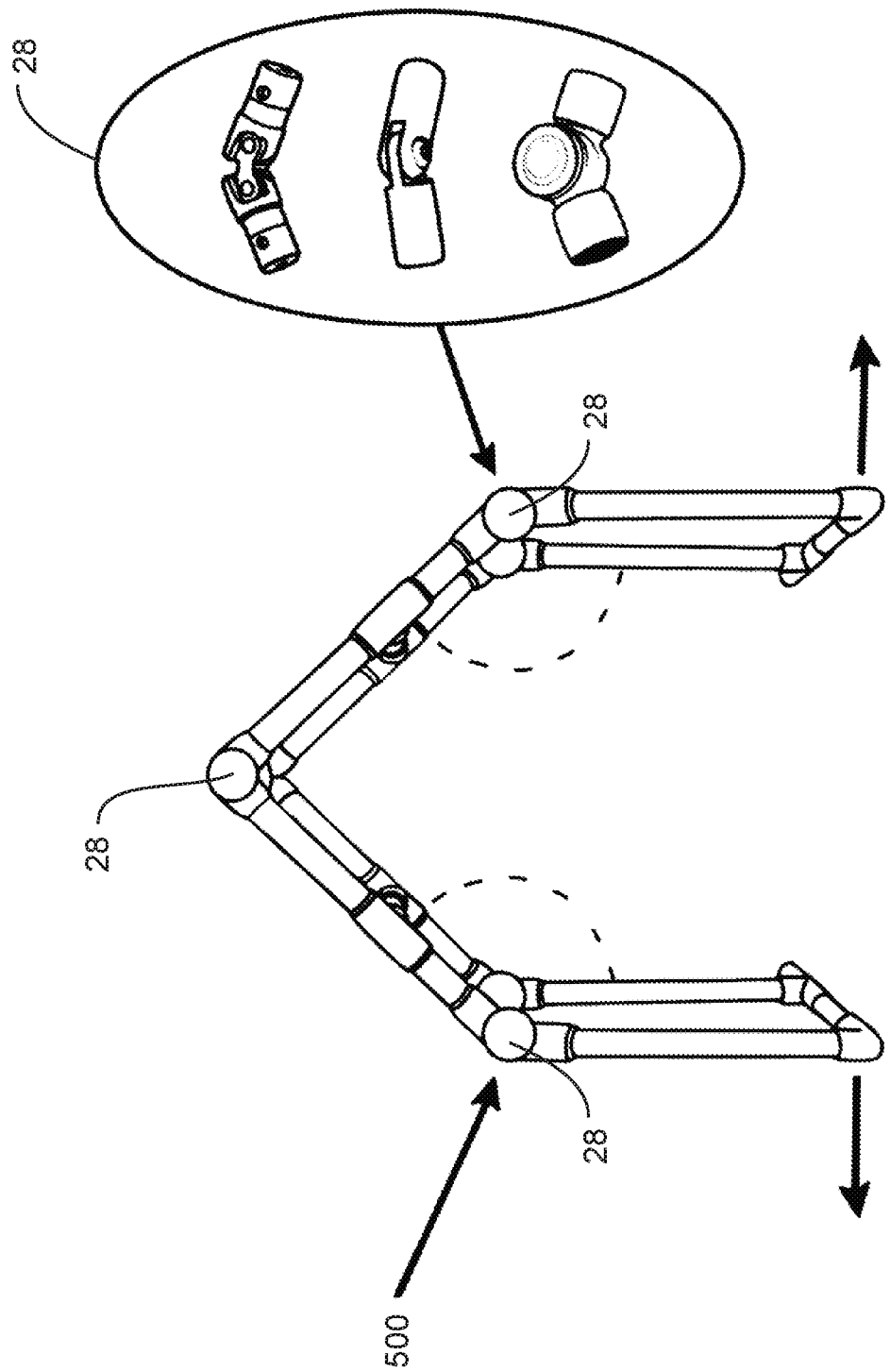
FIG. 5 is an enlarged illustration of a kayak corral showing a wide range of motion with various hinge designs according to some embodiments.

According to some embodiments, the kayak corral is adjustable. FIG. 5 illustrates various flexible joints that can be used to connect the railing bars 500. According to certain embodiments, the disclosed kayak corral is adjustable to fit kayaks or water vessels of different sizes. By inserting pivot or rotational joints at joints 28, the corral can be collapsed or expanded. The adjustable joints would also enable the corral to collapse for easy storage. Various mechanical joints are suitable for this embodiment (e.g., rotational joint with click and lock mechanisms, rotational joint with screw mechanisms, and rotational joint with insertion and lock mechanisms etc.).

Figure 6:
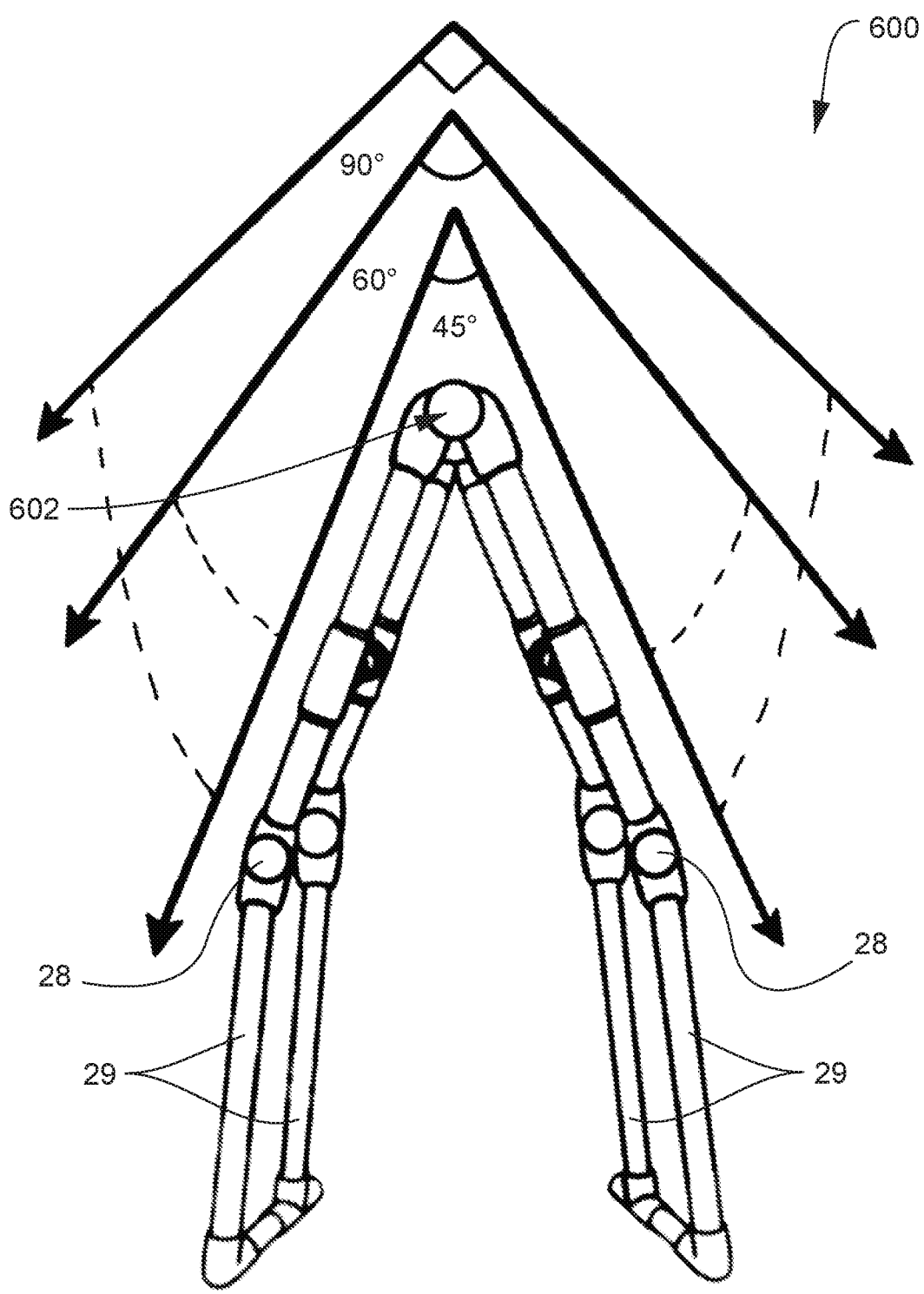
FIG. 6 is an illustration depicting the adjustable feature of a kayak corral according to certain embodiments.

FIG. 6 illustrates the adjustable range of kayak corral 600 according to certain embodiments. Depending on the type of flexible joints used, the opening angle of the frontal joint 602 can be between 45 to 90 degrees. In some embodiments, a pivot joint is used. The pivot joint would allow the corral to open and close at discrete angles (e.g., 45, 60 and 90 degrees only). In some embodiments, a rotational joint is used. The rotational joint would allow the corral to open and close to any angles within the limitation of the rotational joint. Besides making the corral adaptable to different kayaks, this feature enables the kayakers to adjust the corral based on the size of the animal passenger. In some embodiments, the railing bars 29 can also be adjusted to a different length.

Figure 7:
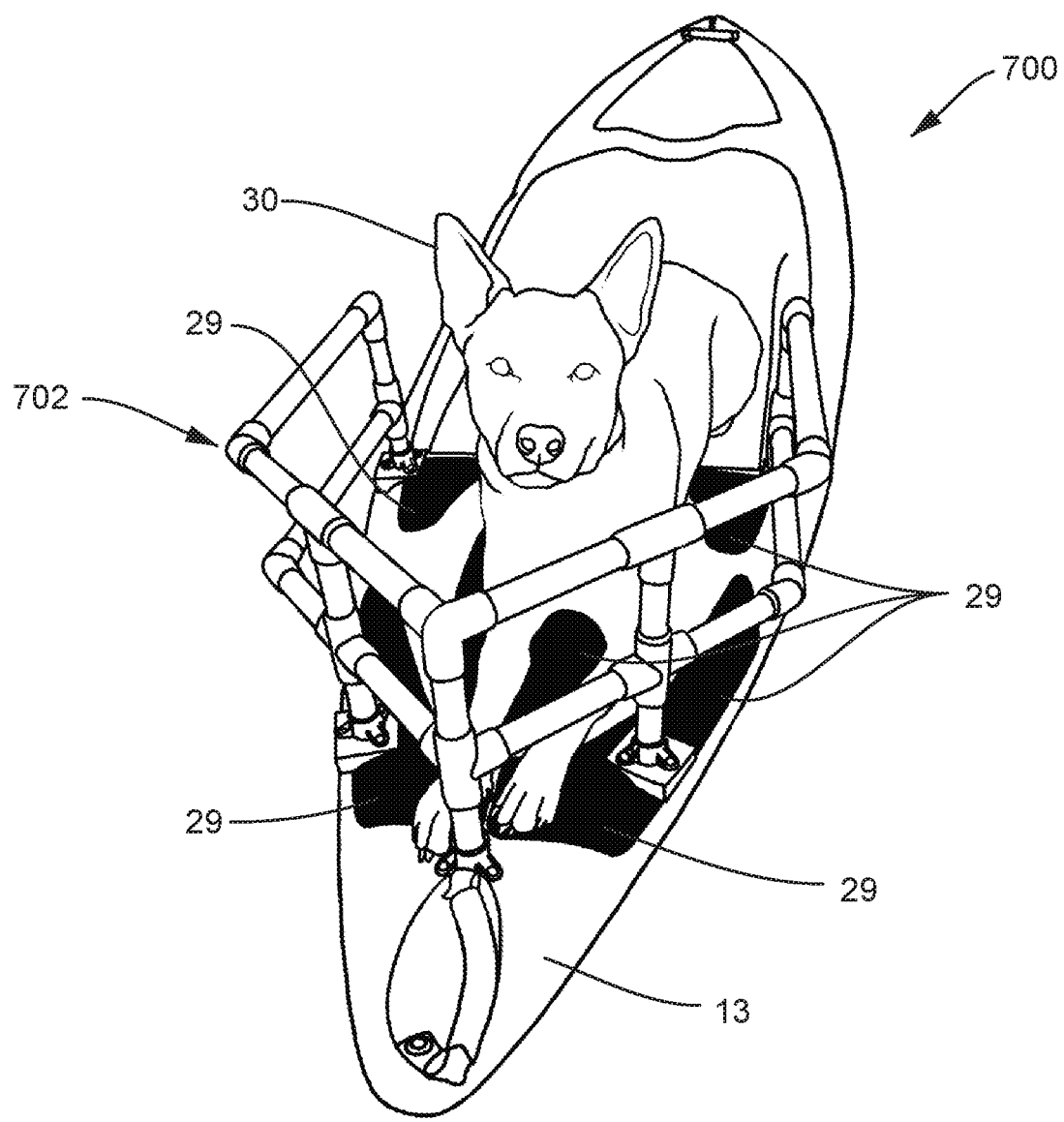
FIG. 7 is a frontal view of a kayak corral with a grip system installed according to certain embodiments.

FIG. 7 is a frontal view of a pet carrier system 700 designed for the kayak 13 according to certain embodiments. The system includes kayak corral 702 and the gripping system 29. In some embodiments, the gripping system is made of multiple sheets of gripping pads. In some embodiments, the gripping pads have a gripping surface on the top and adhesives on the bottom. The gripping surface can be made of various gripping/friction materials including but not limited to leather, synthetic leather, EVA foam, synthetic rubber, recycled rubber, silicon-based paper, marine grip tape, heavy duty nylon. It is desirable for the gripping surface to be made of a material that has a high friction coefficient even when it is wet. The friction coefficient generally depends on the material and the pattern on the gripping surface. As for the bottom of the gripping pads, different types of adhesives can be used, such as flex rubber, gorilla glue, super glue, metallic based adhesive etc. The adhesives should be strong enough to withstand exposure to the environment. In addition, the adhesives should be able to keep the pads attached even when the pads are wet. Other adhesion methods may also be used (e.g., sewing or stapling). However, if an adhesion method requires puncturing through the kayak, a water repellant (such as flex rubber) should be applied to avoid water entering the vessel.

In some embodiments, the gripping system 29 is big enough to cover the area enclosed by the kayak corral. FIG. 7 shows a dog 30 sitting on the gripping system 29. In some embodiments, the gripping pads are manufactured in one sheet with cutouts to allow users to peel and attach them to the kayak. In some embodiments, the gripping pads are manufactured in individual pieces. In some embodiments, the gripping system is big enough to cover the entire top surface of the bow.

Figure 8:
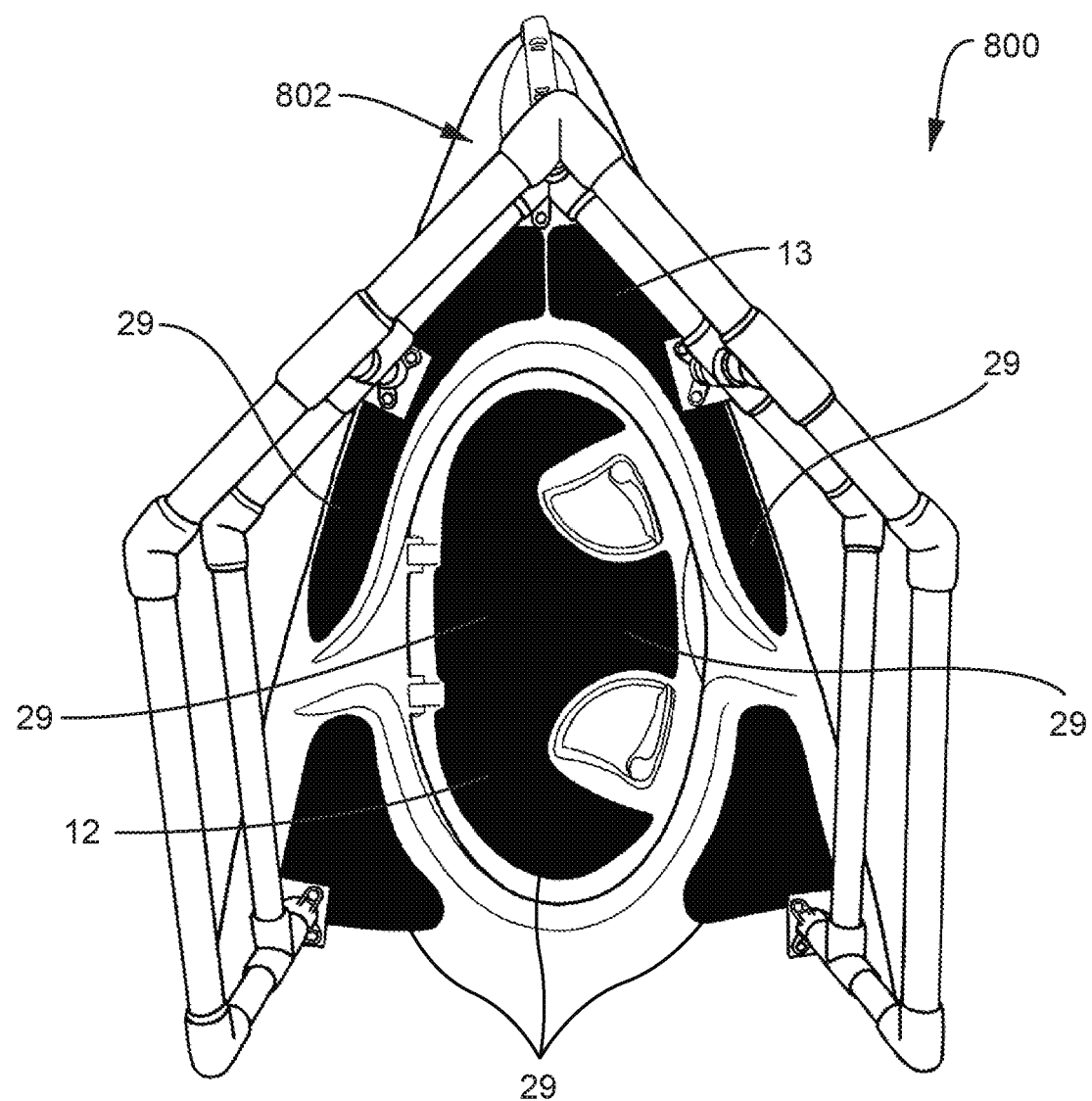
FIG. 8 is a plain view of a kayak corral with a grip system installed according to certain embodiments.

FIG. 8 is a plain view of pet carrier system 800 designed for kayak 802 according to certain embodiments. The gripping system 29 includes five gripping pads attached to the top surface of the bow area. The five gripping pads are configured to cover as much area as possible without hindering the access to the storage compartment door 12. Depending on the kayaks, the gripping pads can be configured differently.

Figure 9:
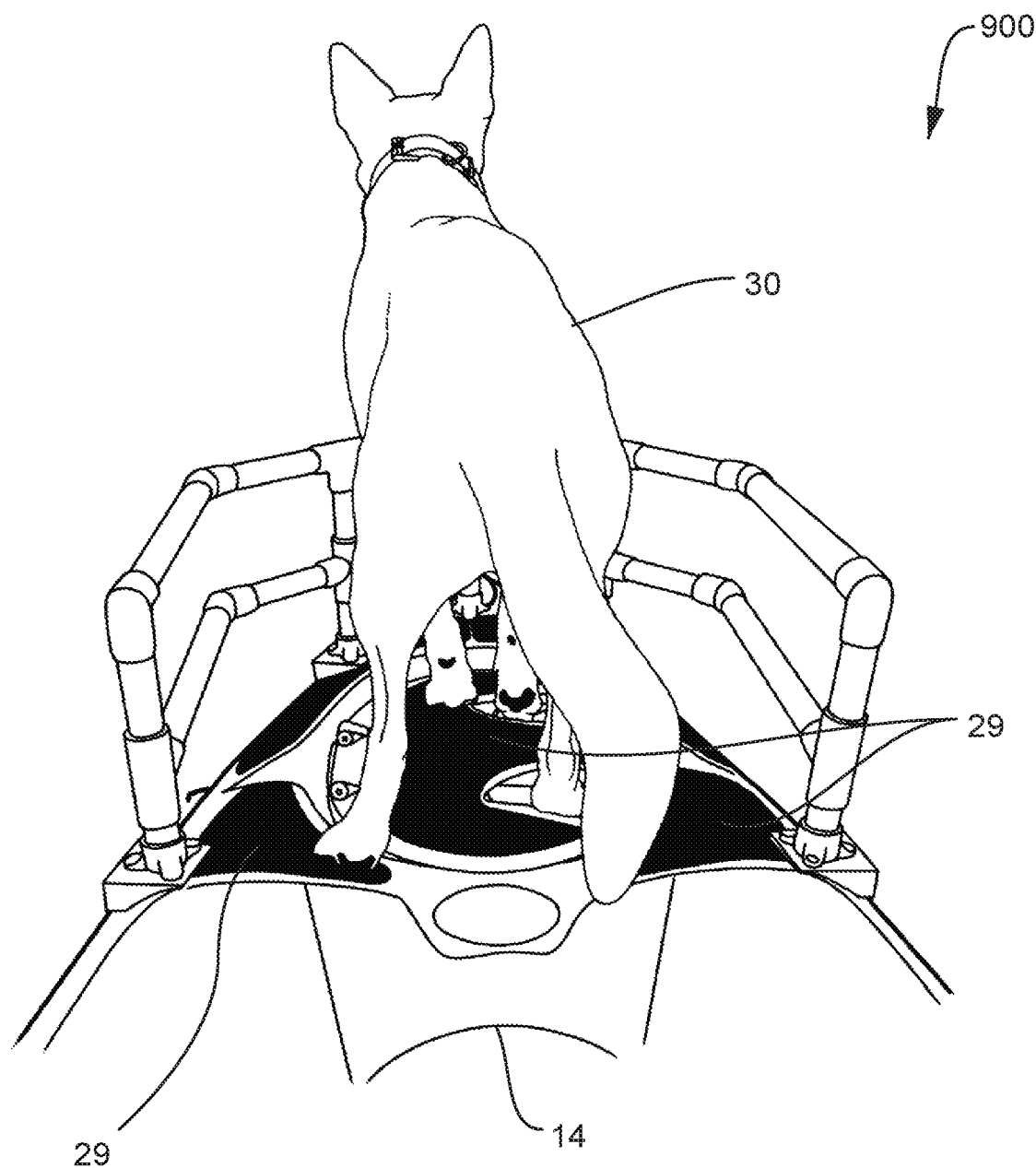
FIG. 9 is an enlarged view of a kayak corral with a grip system installed from the kayaker's viewpoint according to certain embodiments.

FIG. 9 is a kayaker's view of pet carrier system 900 with dog 30 standing on the gripping system 29 according to certain embodiments. It is preferred that the area within the corral is big enough for the animal passenger to stand, sit, and turn around.

Figure 10:
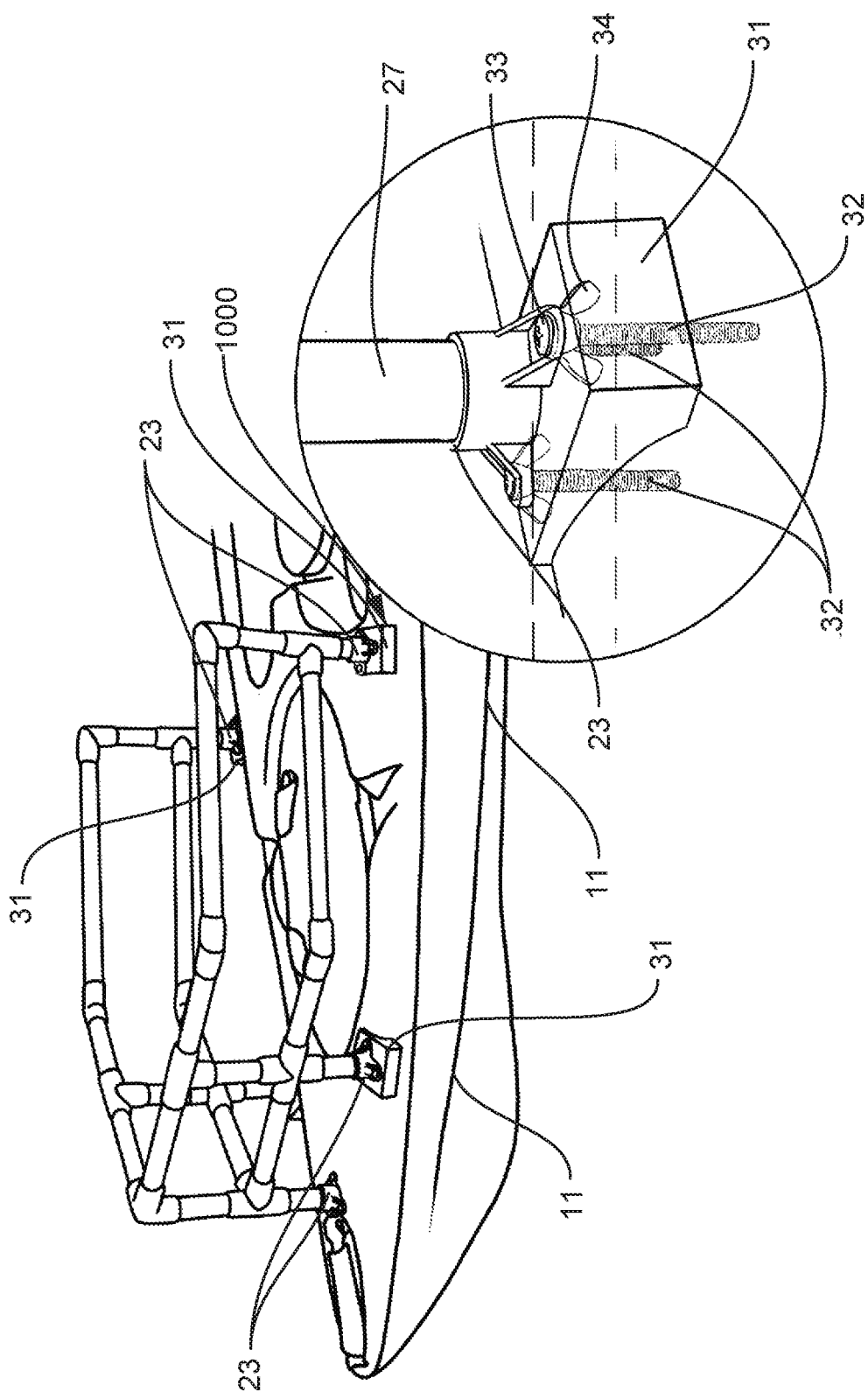
FIG. 10 is a side view of a kayak corral demonstrating a drill-mounted design according to certain embodiments.

FIG. 10 is a see-through view of a corral attachment point 1000 according to certain embodiments. The base connector 23 with three legs is screwed to the attachment block 31 of the kayak. The posts 27 is inserted into the base connector's receiving socket. The screws 32 and the back plates 34 work together to secure the base connector firmly to the kayak. In some embodiments, water repellent is applied to the connecting and seam areas to prevent water from entering the kayak.

Figure 11:
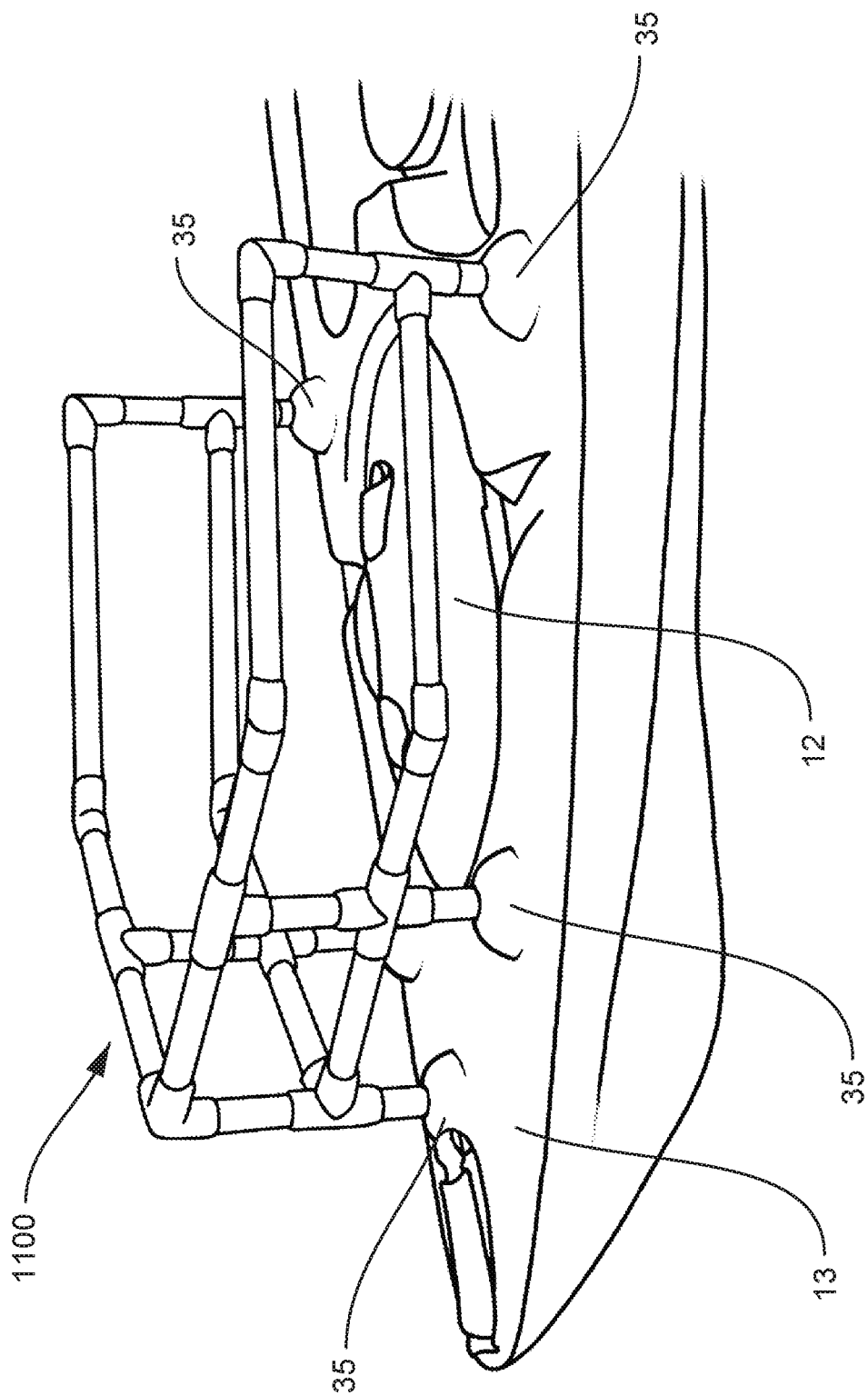
FIG. 11 illustrates a side view of a kayak corral factory-molded to a kayak according to certain embodiments.

FIG. 11 is a port side view of the kayak corral 1100 designed for kayak 13 with storage door 12 according to certain embodiments. FIG. 11 illustrates a different mounting mechanism for the kayak corral. In this embodiment, the corral is factory molded to the kayak at the connecting areas 35. An advantage of such a design is reduction of water entry points. Compared to FIG. 10 where water may enter the kayak via any one of the screws for each base connector, FIG. 11 has a single point of water entry for each connecting base. To prevent water from entering the kayak, in some embodiments, cogging is used around the molding areas. In some embodiments, rubber rings or wax rings are used in the connecting areas.

Figure 12:
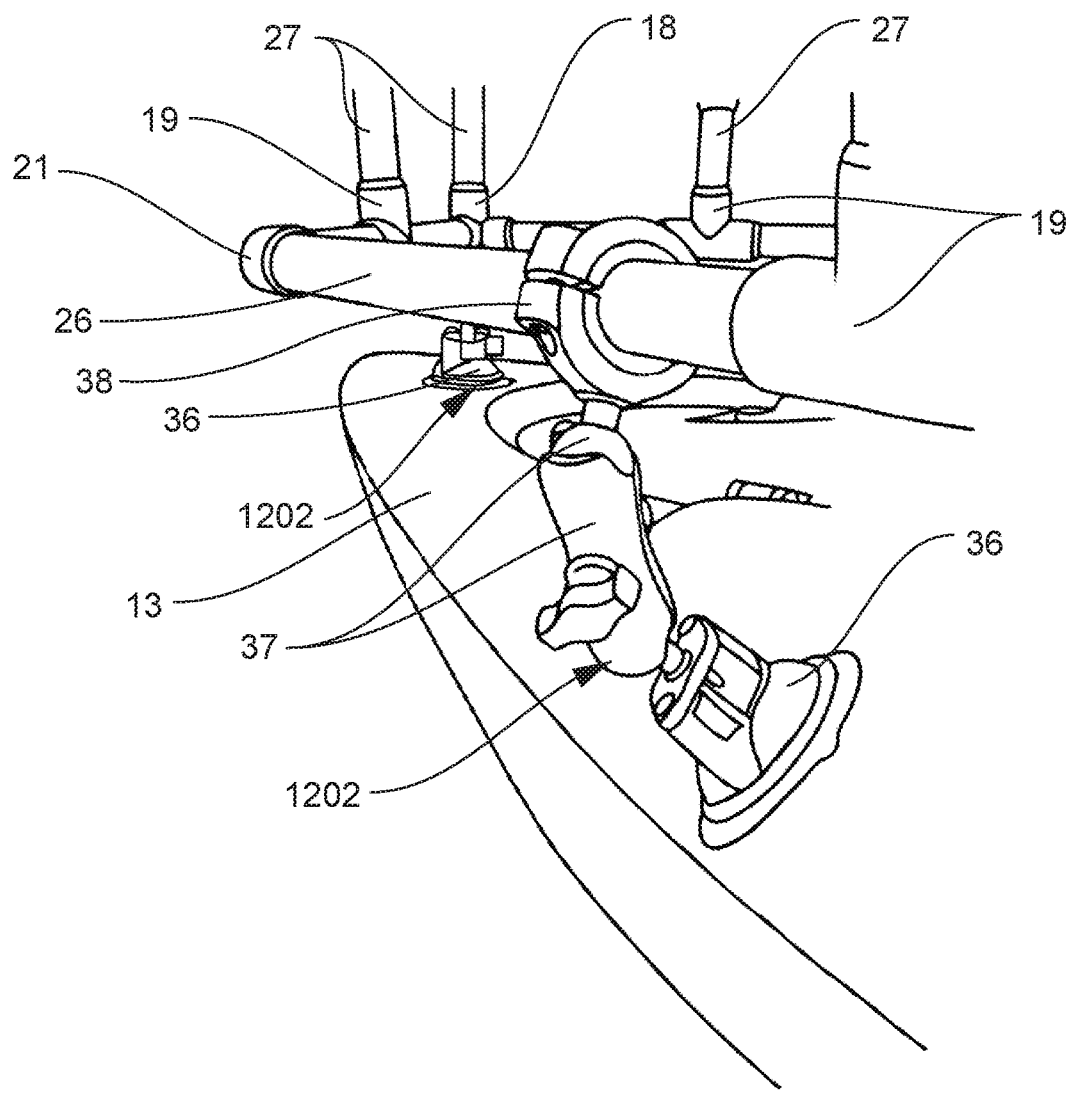
FIG. 12 illustrates an enlarged view of a suction-type mount for attaching a kayak corral according to certain embodiments.
Figure 13:
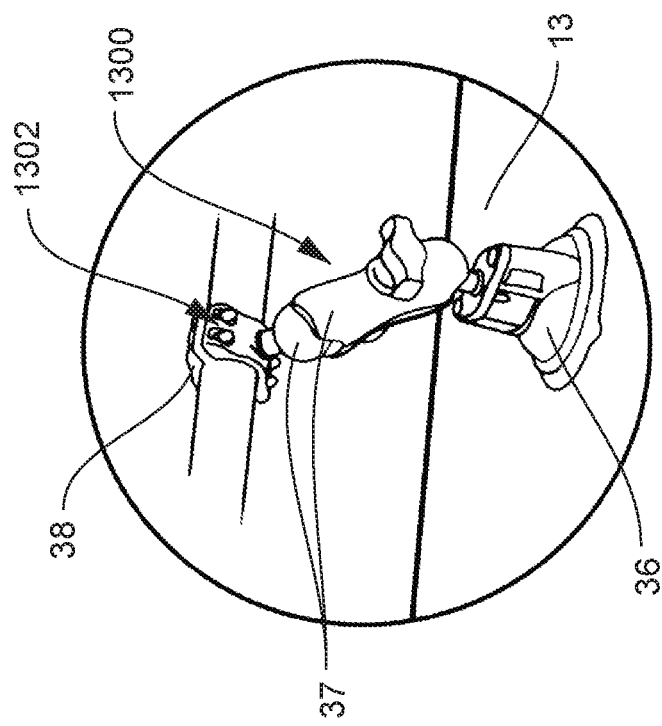
FIG. 13 is an isolated illustration of a suction-type mount according to certain embodiments.

FIGS. 12 and 13 are a close-up view of a different connecting mechanism for attaching the corral to the kayak. FIG. 12 illustrates attaching the corral to kayak 13 via suction mounts 1202. The suction mounts 1202 contain a suction cup 36, a rotatable body with a ball socket 37, and a clamper 38 with a ball connector. Similarly, FIG. 13 illustrates a suction mount 1300 with suction cup 36, ball joint connector 37, and clamper 38 according to some embodiments. According to some embodiments, clamper 38 of FIG. 13 is closed via two screws 1302.

As depicted in FIG. 12, in operation, the suction mounts are attached to the bow. The rotatable body 37 is connected to the suction cup 36 and the clamper 38 where the clamper holds at least a portion of the railing bar. To mount the kayak corral, the lower level bar is inserted into the clamper via the clamper's "C" shaped opening. Once the cylindrical (or tubular) body of the bar is fully inserted, the screws are used to close the "C" shaped opening and change the clamper to an "O" shape. In some embodiments, more than one screw is used. In some embodiments, the clampers may have a different shape that complements the body of the bar (i.e. square or hexagon bars, etc.). In some embodiments, the opening is closed by other fastening means such as a buckle, chain, nail, zipper or other suitable fastening means.

Figure 14:
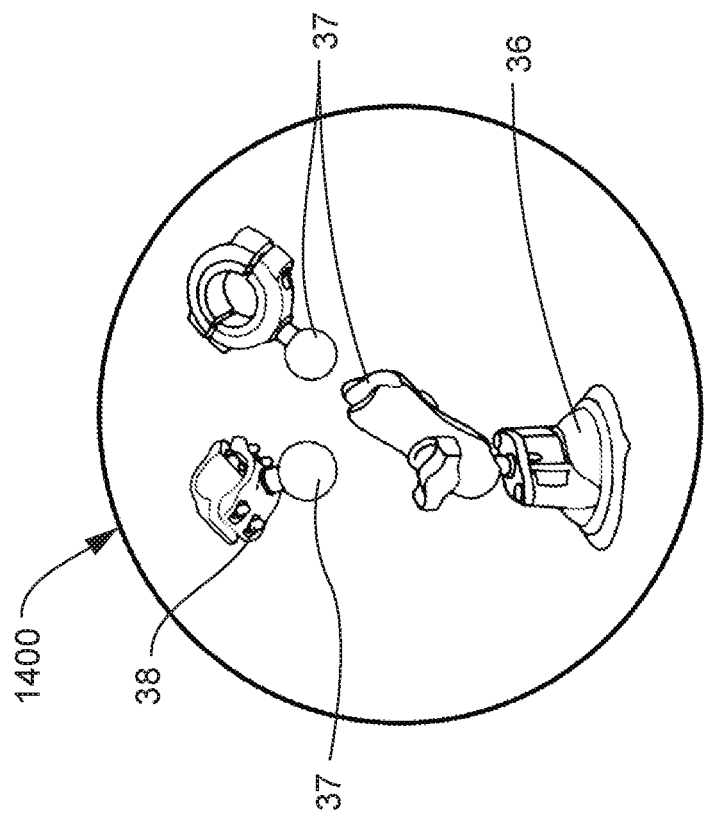
FIG. 14 is an exploded illustration of a suction-type mount according to certain embodiments.

FIG. 14 is an exploded view of suction mount 1400 according to certain embodiments. Suction cup 36 is the base. The clamper 38 is attached to the rotatable body via a ball joint connector 37. The ball joint connector allows the clamper to rotate to different angles to grab the railing bar. One advantage of the suction mount mechanism is the avoidance of puncturing the kayak during the installation. Doing so prevents water from entering the kayak through the base connectors. In addition, suction mounts reduce the need to prepare the kayak surface for mounting. If a bow area is too small for securing five posts, the suction mount can secure the corral with just 3 mounts on any flat surface. Hence, it also adds flexibility. Furthermore, the suction mounts make attaching and detaching the railings easier.

FIGS. 15 and 16 are port side views of kayak corrals 1500 and 1600 according to certain embodiments. FIGS. 15 and 16 illustrate the installation of safety nets 39 over the kayak corral to provide added protections. In some embodiments, the safety net may be added only between the first and second level railing bars (FIG. 15). In some embodiments, the safety net 39 is hooked to the clips 40 on the kayak, and can cover the whole kayak corral (FIG. 16). This design can prevent dogs from accidentally reaching over the railing and causing the kayak to rock from side to side.

Figure 17:
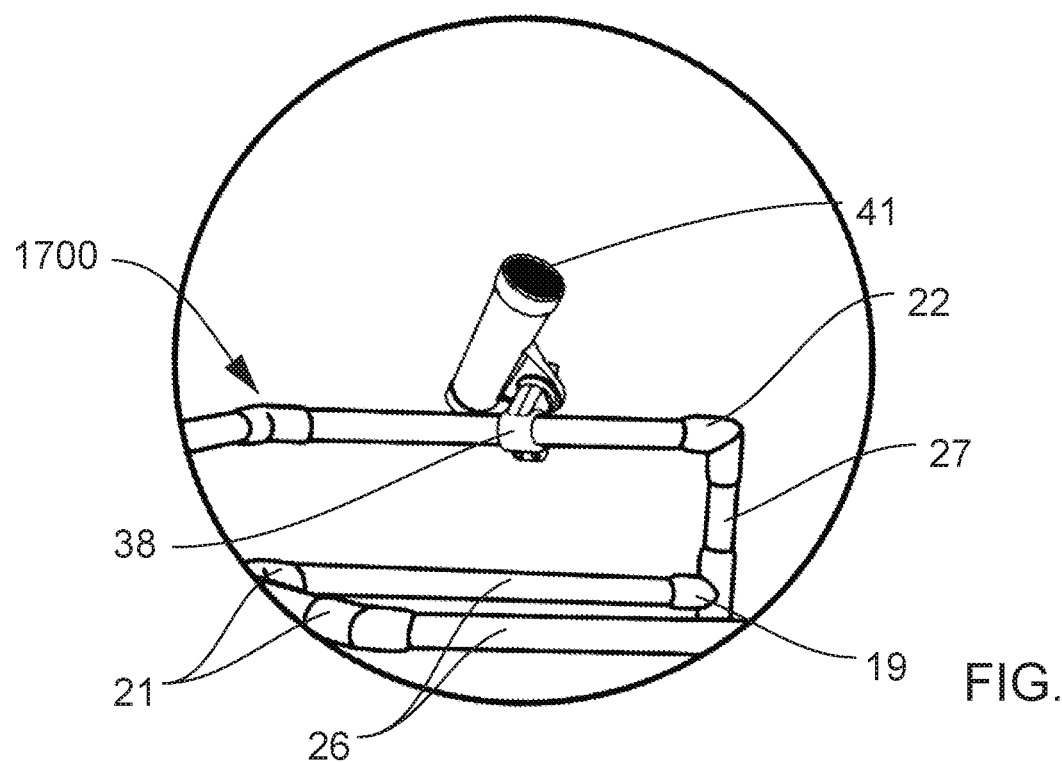
FIG. 17 is an illustration of a kayak corral with a fishing pole accessory mount according to certain embodiments.
Figure 18:
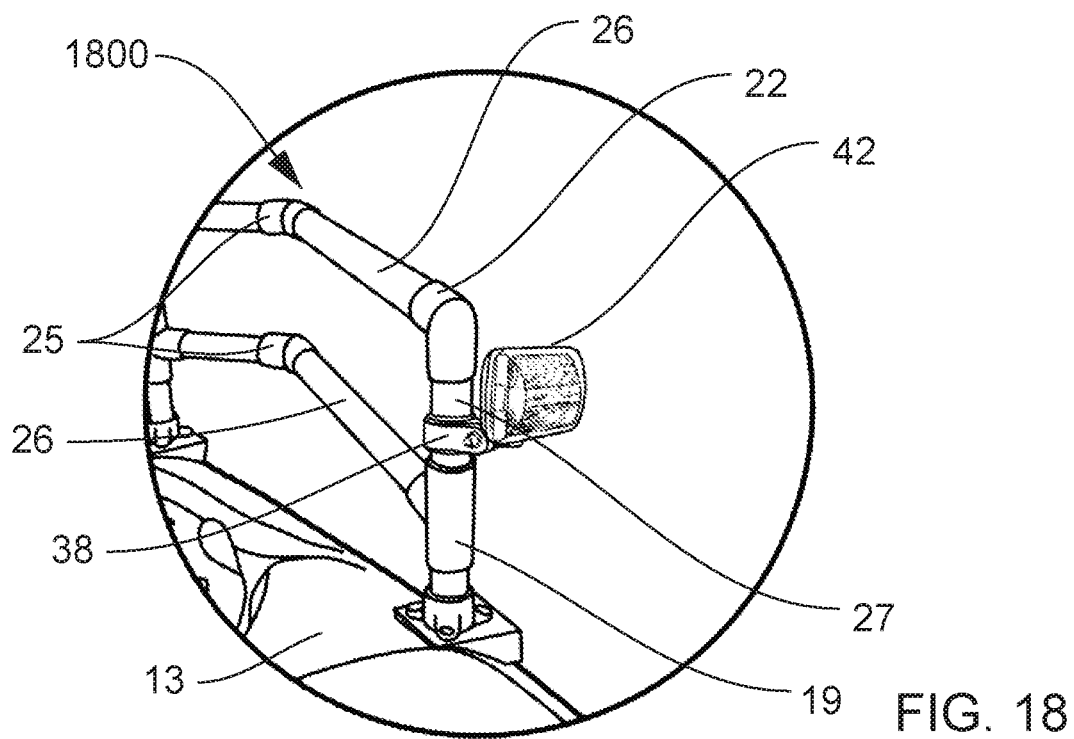
FIG. 18 is an illustration of a kayak corral with a navigational lighting mount according to certain embodiments.

According to certain embodiments, the corral is built for attaching various accessories. FIG. 17 illustrates a view for securing a fishing rod holder 41 to kayak corral 1700 according to certain embodiments. FIG. 18 shows securing a navigation light 42 to kayak corral 1800 according to certain embodiments. In some embodiments, the accessories are attached to the railing via C shaped clamps similar to the ones described in FIGS. 13-15. In some embodiments, the accessories are attached via other grabbing mechanisms such as a strap, chain, tape, rope, or other mechanical hinges. According to some embodiments, these attachment systems would allow kayakers to bring more gear onboard without sacrificing existing storage space. In some embodiments, the clamps may be closed via a spring mechanism, chain mechanism, buckles, or a combination thereof.

The kayak corral according to certain embodiments, is not designed to secure cargo, or provide easy access to the cargo. It is designed to help the dog to feel safe and discourage the dog from moving side to side. Therefore, according to certain embodiments, the kayak corral is attached to the extreme end of the bow as shown in FIG. 3. Although a kayak corral may be placed closer to the kayaker, doing so would reduce the amount of space available for the dog to move. Depending on the dog's size, such configuration may be uncomfortable for the dog. In addition, it is generally known that the extreme ends of the kayak get the most water splashing during voyage. Therefore, it may not be ideal to place cargo so close to the extreme ends of the kayak when the space is enclosed by the kayak corral.

According to certain embodiments, the height of the kayak corral can be adjusted. In some embodiments, the kayak corral is adjusted to about the pet passenger's shoulder height. In some embodiments, the height of the kayak corral is about 1 ft. In some embodiments, the height is about 2 ft. In some embodiment, the height is about 3 ft. In some embodiments, the height is adjusted to a position where the railings are not blocking the kayaker's view. In some embodiments, the kayak corral is designed to be wider than the bow area. In some embodiments, the kayak corral is designed to be narrower than the bow area.

Figure 19:
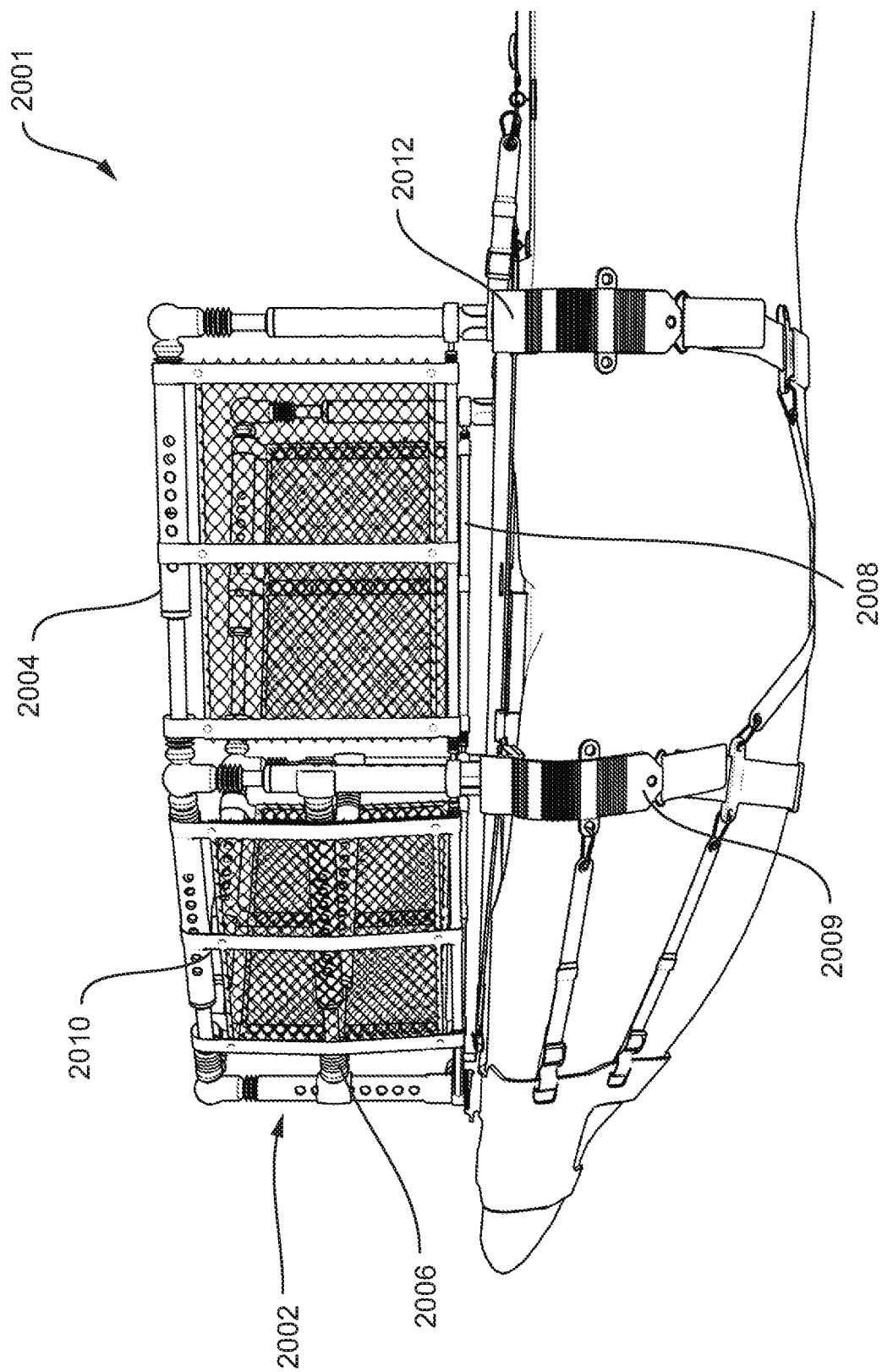
FIG. 19 is an illustration of a side view of a kayak corral mounted on a kayak according to certain embodiments.

In one embodiment, a kayak corral 101 is secured to a kayak via a set of adjustable bands with friction pads. FIGS. 19-22 illustrate such embodiment. In FIG. 19, the kayak corral 2001 of the pet carrier system 2000 is made of five vertical adjustable posts 2002 connected by four adjustable upper bars 2004 and four adjustable lower bars 2008. As shown in the figure, three of the five vertical adjustable posts 2002 closer to the frontal tip of the kayak are further connected by two adjustable mid-level bars 2006. In some embodiments, the adjustable lower bars 2008 have smaller diameters compared to the other bars and posts. A mesh panel (or safety net) 2010 is secured between each adjustable upper bar 2004 and each adjustable lower bar 2008 by multiple strap loops. In some embodiments, mesh panels 2010 are attached to the bars using aluminum rivets. In some embodiments, the mesh panels 2010 are reinforced with nylon webbing to make them flexible and easy to install.

According to some embodiments, the adjustable posts and bars are made of telescopic flexible tubing. That is, they have at least two sliding tubes with different diameters. The tube with a smaller diameter can be inserted into or pulled away from the tube with a bigger diameter. Various materials can be used for the telescopic flexible tubing including, but not limited to, fortified plastic, fiber glass, aluminum, or a combination thereof. According to some embodiments, it is desirable for the material to be resistant to water damage. In some embodiments, a water protective coating is applied to the posts and bars. In some embodiments, the posts and bars are length/height adjustable with a push button. The push button mechanism offers indexed adjustment and allows the structure to stay in a fixed length or height. In some embodiments, the length is adjustable via a twist and pull mechanism.

Figure 20:
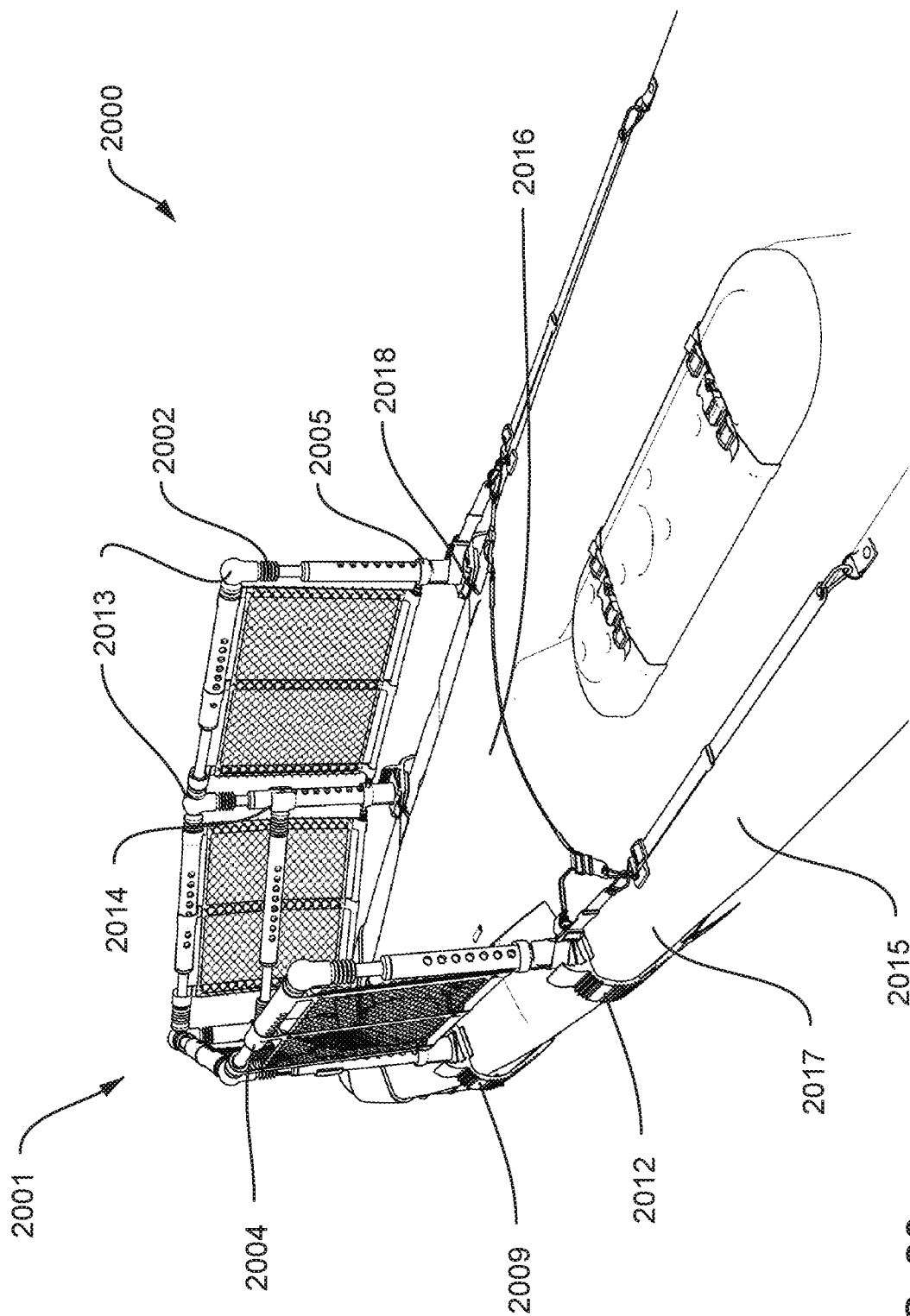
FIG. 20 is an illustration of a cockpit view of a kayak corral mounted on a kayak with a grip system installed according to certain embodiments.

FIG. 20 is a cockpit view of the pet carrier system 2000. FIG. 20 illustrates various mechanical joints in the pet carrier system 2000. At the bottom of the vertical adjustable posts 2002 (along both sides of the kayak), there are indexing joints 2012 for securing the kayak corral 2001 to the kayak. The indexing joints 2012 have one or more sockets/grooves to enable the vertical adjustable posts 2002 to pivot at a specific indexing position. In some embodiments, indexing joints 2012 lock the vertical adjustable posts 2002 to a certain angle with respect to the surface of the kayak. The indexing joints 2012 also have an extension portion 2009 that curves around the edge of the kayak. According to some embodiments, extension portion 2009 has an inward coil tension which causes extension portion 2009 to coil into a compact spiral form (not shown) in its natural state. FIG. 20 shows extension portion 2009 in its expanded form. Due to the inward coil tension, in its expanded form, extension portion 2009 clamps the edge of the kayak edge. This helps secure corral 2001 to the kayak. In some embodiments, extension portion 2009 includes multiple segments of friction hinges. In some embodiments, the friction hinges are made of steel and are coated with plastic, rubber, or silicon for enhanced grip, and rust/scratch protection. In some embodiments, extension portion 2009 enables corral 2001 to be secured via straps and bands (see FIG. 22).

FIG. 20 also shows that vertical adjustable posts 2002 and adjustable upper bars 2004 are connected via modular flexible connectors 2013. These modular flexible connectors enable easy assembly of the kayak corral 2001. In some embodiments, modular flexible connectors 2013 connect bars and posts via a twist and lock mechanism. In some embodiments, modular flexible connectors 2013 connect bars and posts via an insert and lock mechanism. The two adjustable mid-level bars 2006 are attached via clamp mechanisms 2014 for easy assembly. In some embodiments, the clamp width of the clamp mechanisms 2014 can be adjusted according to the diameter of the vertical adjustable posts 2002. As shown in the figure, the adjustable lower bars 2008 are connected via ring connectors 2005. In some embodiments, the diameter of these ring connectors can be adjusted.

Besides the mechanisms for kayak corral assembly, FIG. 20 also illustrates an assembly of a gripping pad system. In particular, the assembly includes a durable gripping pad 2016 connected to the kayak via adjustable straps 2015 and carabiners 2017. As shown, the durable gripping pad 2016 is connected to the base of the indexing joints 2012 via straps and D-rings 2018. These connection mechanisms provide flexibility to allow the gripping pad to be installed on kayaks of different sizes. In some embodiments, the surface of the gripping pad 2016 is furnished with textured neoprene to increase its friction. Other materials can also be used, including, for example, elastomeric fabric, leather, synthetic leather, EVA foam, synthetic rubber, recycled rubber, silicon-based paper, marine grip tape, heavy duty nylon, and a combination thereof. In some embodiments, the adjustable straps 2015 are tension straps. It is generally desirable for the durable padding to be made of a material with a high friction coefficient. In some embodiments, the surface of the gripping pad has a honeycomb pattern for increasing surface traction. Other patterns may also be used to achieve the desired friction coefficient. Also, it is desirable for the adjustable straps, carabiners, and D-rings to be made from materials resistant to water damage. In some embodiments, the carabiners are made of light weight metals, the D-rings are made of stainless steel, and the adjustable straps are made of nylon.

Figure 21:
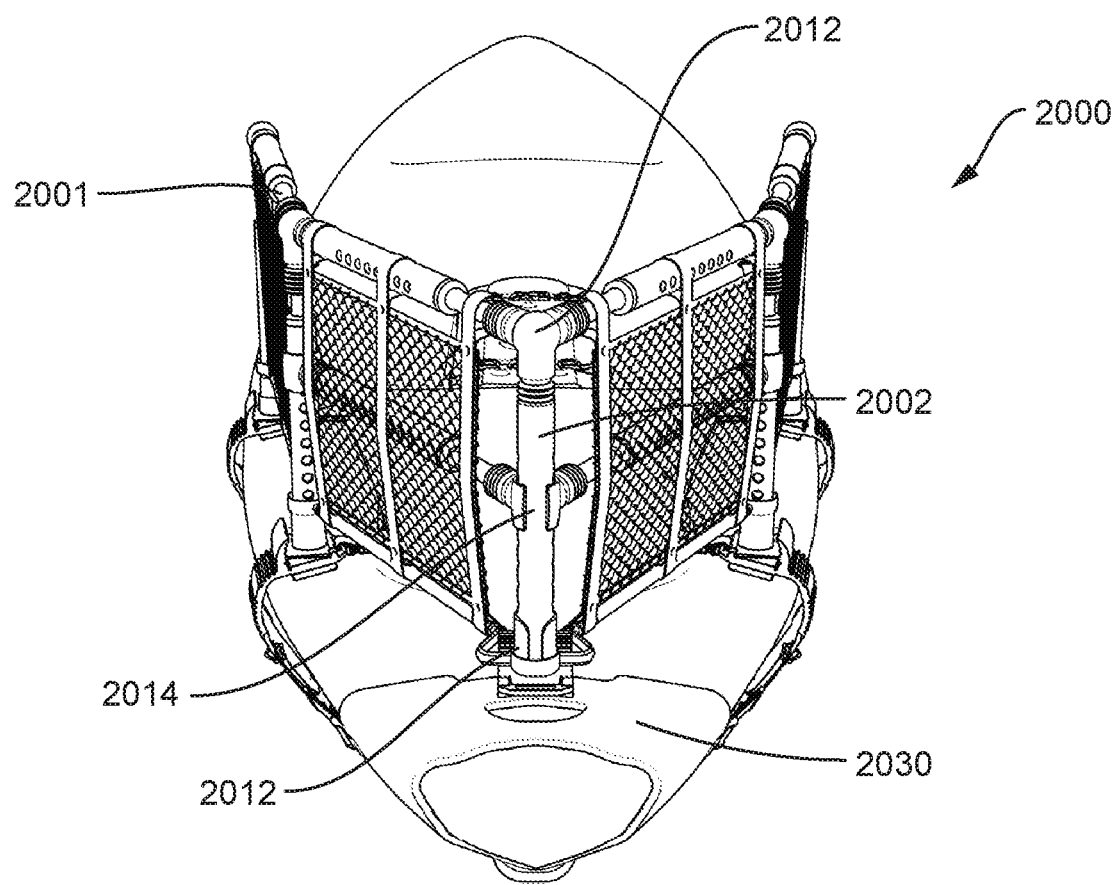
FIG. 21 is an illustration of a frontal view of a kayak corral mounted on a kayak according to certain embodiments.

FIG. 21 is a frontal view of the pet carrier system 2000 mounted on a kayak. In this figure, a bow saddle 2030 is strapped over the frontal portion of the kayak. Depending on the vessel, bow saddle 2030 can be made of rigid or elastic materials. In some embodiments, the bow saddle is made of thermoplastic rubbers or thermoplastic elastomers (TPE). Thermoplastic elastomers have many physical properties of rubbers, for example, softness, flexibility, and resilience. In some embodiments, the saddle is made of other types of materials such as silicone rubbers.

Figure 22:
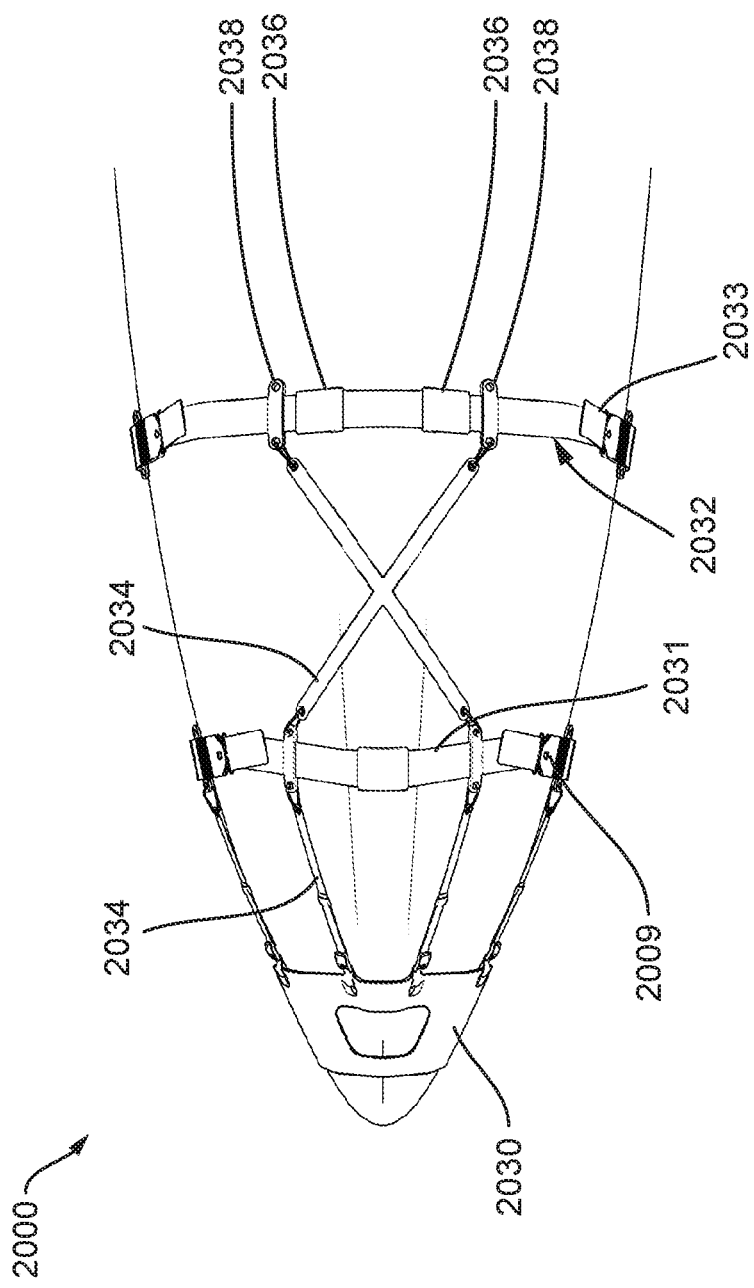
FIG. 22 is an illustration of a bottom view of a kayak corral mounted on a kayak according to certain embodiments.

FIG. 22 is a bottom view of the pet carrier system 2000. This figure illustrates how various mechanisms work together to secure kayak corral 2001 to a kayak according to certain embodiments. The extension portions 2009 of the opposing indexing posts 2012 are connected via elastic bands 2031 and 2032. Due to the shape of the kayak, elastic band 2031 is relatively shorter than elastic band 2032. The length of the elastic bands 2031 and 2032 is adjustable over the D-rings 2033 attached to the extension portions 2009 (see FIG. 19). In some embodiments, Velcro is used to fix the length of the elastic bands. Other securing mechanisms, such as buttons or rivets, may also be used. Elastic straps 2034 are used to connect bow saddle 2030 and the elastic bands 2031 and 2032 to provide extra stability. FIG. 22 shows two elastic straps 2034 connecting bow saddle 2030 to the extended portion 2009 of the indexing post 2012, two parallel elastic straps 2034 connecting the bow saddle to elastic band 2031 (shorter band), and two crossing elastic straps connecting the shorter band to elastic band 2032 (longer band). Besides the connections to bow saddle 2030, all other connections are secured via carabiners. As shown by FIG. 19, elastic straps extending from bow saddle 2030 are secured by strap tightening mechanisms. Returning to FIG. 22, other elastic straps are secured to the elastic bands 2031 and 2032 via hook loops 2038. These hook loops allow the straps to be quickly installed and removed.

In addition to the elastic bands and straps, FIG. 22 shows that friction pads 2038 are attached to the elastic bands 2031 and 2032. The strap friction pads 2038 are made of materials with high friction coefficient such as thermoplastic fabric or silicone rubber. These pads are positioned to contact the bottom surface of a kayak to help secure elastic bands against the kayak. Because the securing mechanisms described in FIG. 22 will be submerged underwater during voyage, it is ideal for the mechanisms to be resistant to water damage.

It is contemplated that apparatus and processes of the disclosed invention encompass variations and adaptations developed using information from the embodiments described herein. Adaptation and/or modification of the system, devices, and apparatus described herein may be performed by those of ordinary skill in the relevant art.

Throughout the description, where articles, devices, and systems are described as having, including, or comprising specific components, it is contemplated that, additionally, there are articles, devices, and systems of the present disclosure that consist essentially of, or consist of, the recited components.

It should be understood that the order of steps or order for performing certain actions is immaterial so long as the disclosure remains operable. Moreover, two or more steps or actions may be conducted simultaneously. The mention herein of any publication, for example, in the Background section, is not an admission that the publication serves as prior art. The Background section is presented for purposes of clarity and is not meant as a description of prior art.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the design of other structures, methods, and systems for carrying out the several purposes of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A pet carrier system for providing a defined area on a kayak for safe travel of a pet, comprising:
    a corral including:
        at least three vertical posts securable to the kayak, wherein one of the at least three vertical posts is securable near the bow of a kayak and projecting generally perpendicular to the top surface of a kayak, and remaining vertical posts are securable generally on opposing edges of, and perpendicularly to, the top surface of the kayak;
        at least two railing bars connecting the at least three vertical posts; and
        at least three connectors each securing a corresponding one of the at least three vertical posts to the kayak;
        wherein the corral is constructed and arranged to provide a fenced structure from the bow of the kayak up to an area in front of a cockpit of the kayak to define a space having a shape generally longer along the longitudinal axis of the kayak and generally shorter transverse to the longitudinal axis, in which a front end of the fenced structure is closed and an end near the cockpit is open, and in which due to the shape of the defined space would dissuade a pet from moving transversely relative to the longitudinal axis of the kayak and which would persuade the pet to either remain in the defined space or to move relatively aligned with the longitudinal axis of the kayak in the defined space, and
        wherein a height of the at least two railing bars is adjustable from at least about one foot so that the railing bars can be moved to not block the view of a user of the kayak.

2. The pet carrier system of claim 1, wherein the at least two railing bars are connected to the vertical post secured near the bow of the kayak via a joint.

3. The pet carrier system of claim 2, wherein the joint is a fixed angle joint, a pivot joint, a rotational joint, or a ball joint.

4. The pet carrier system of claim 1, wherein the length of at least one of the at least three vertical post is adjustable.

5. The pet carrier system of claim 1, wherein the length of at least one of the at least two railing bars is adjustable.

6. The pet carrier system of claim 1, wherein the railing bars and the vertical posts are made of plastic, fortified plastic, carbon fiber, fiberglass, wood, or metal.

7. The pet carrier system of claim 1, wherein the railing bars and the vertical posts have a hollow center.

8. The pet carrier system of claim 1, wherein at least one of the at least three connectors is a suction mount with a suction cup, a ball joint connector, or a clamper.

9. The pet carrier system of claim 1, wherein at least one of the at least three connectors is an indexing connector configured to lock the vertical post into a particular position.

10. The pet carrier system of claim 1, further comprises a gripping system installed over the surface area, in front of the cockpit, fenced by the corral.

11. The pet carrier system of claim 10, wherein the gripping system comprises a gripping pad made of rubber, leather, or nylon.

12. The pet carrier system of claim 1, wherein a safety net is installed on the corral, said safety net extending between the vertical posts and generally perpendicular to a top surface of the kayak.

13. The pet carrier system of claim 1, wherein the connectors are removably attached to the kayak such that the removal of the corral would not puncture, scratch, or leave marks on the kayak surface.

14. The pet carrier system of claim 1, wherein at least two of the at least three connectors are located opposite of each other, one on each side of the kayak.

15. The pet carrier system of claim 1, wherein the corral further comprises five vertical posts defining a generally pentagonal periphery with an open end facing the cockpit from which a pet may enter and leave the defined space.

16. A pet carrier system for providing a defined area on a kayak for safe travel of a pet, comprising:
   a corral including:
      at least three vertical posts securable to the kayak, wherein one of the at least three vertical posts is securable near the bow of a kayak and projecting generally perpendicular to the top surface of a kayak, and remaining vertical posts are securable generally on opposing edges of, and perpendicularly to, the top surface of the kayak;
      at least two railing bars connecting the at least three vertical posts; and
      at least three connectors each securing a corresponding one of the at least three vertical posts to the kayak;
   wherein the corral is constructed and arranged to provide a fenced structure from the bow of the kayak up to an area in front of a cockpit of the kayak to define a space having a shape generally longer along the longitudinal axis of the kayak and generally shorter transverse to the longitudinal axis, in which a front end of the fenced structure is closed and an end near the cockpit is open, and in which due to the shape of the defined space would dissuade a pet from moving transversely relative to the longitudinal axis of the kayak and which would persuade the pet to either remain in the defined space or to move relatively aligned with the longitudinal axis of the kayak in the defined space,
   wherein the at least two railing bars are connected to the vertical post secured near the bow of the kayak via a joint, and
   wherein an internal angle between the railing bars connected the vertical post secured near the bow of the kayak is adjustable to via opening and closing the joint, wherein the internal angle is adjustable to allow the corral to fit on different size kayaks.

17. A pet carrier system for providing a defined area on a kayak for safe travel of a pet, comprising:
   a corral including:
      at least three vertical posts securable to the kayak, wherein one of the at least three vertical posts is securable near the bow of a kayak and projecting generally perpendicular to the top surface of a kayak, and remaining vertical posts are securable generally on opposing edges of, and perpendicularly to, the top surface of the kayak;
      at least two railing bars connecting the at least three vertical posts; and
      at least three connectors each securing a corresponding one of the at least three vertical posts to the kayak;
   wherein the corral is constructed and arranged to provide a fenced structure from the bow of the kayak up to an area in front of a cockpit of the kayak to define a space having a shape generally longer along the longitudinal axis of the kayak and generally shorter transverse to the longitudinal axis, in which a front end of the fenced structure is closed and an end near the cockpit is open, and in which due to the shape of the defined space would dissuade a pet from moving transversely relative to the longitudinal axis of the kayak and which would persuade the pet to either remain in the defined space or to move relatively aligned with the longitudinal axis of the kayak in the defined space,
   wherein at least two of the at least three connectors are located opposite of each other, one on each side of the kayak, and
   wherein the at least two of the at least three connectors are secured to the kayak by a band or a strap connecting the at least two of the at least three connectors across a bottom portion of the kayak.

* * * * *